United States Patent
Pognant

(10) Patent No.: US 10,809,686 B2
(45) Date of Patent: Oct. 20, 2020

(54) METHODS FOR GENERATING A CONDITIONAL SOFTWARE CODE MODULE, AND METHOD FOR CONTROLLING AT LEAST ONE HOME AUTOMATION SYSTEM FOR A BUILDING

(71) Applicant: OVERKIZ, Metz-Tessi (FR)

(72) Inventor: Sylvain Pognant, Seynod (FR)

(73) Assignee: OVERKIZ, Metz-Tessi (FR)

( * ) Notice: Subject to any disclaimer, the term of this patent is extended or adjusted under 35 U.S.C. 154(b) by 181 days.

(21) Appl. No.: 15/579,389

(22) PCT Filed: Jun. 3, 2016

(86) PCT No.: PCT/FR2016/051328
§ 371 (c)(1),
(2) Date: Nov. 6, 2018

(87) PCT Pub. No.: WO2016/193636
PCT Pub. Date: Dec. 8, 2016

(65) Prior Publication Data
US 2019/0064762 A1 Feb. 28, 2019

(30) Foreign Application Priority Data
Jun. 4, 2015 (FR) .................. 15 55076

(51) Int. Cl.
*G06F 8/30* (2018.01)
*G06F 8/61* (2018.01)
(Continued)

(52) U.S. Cl.
CPC ........... *G05B 19/0426* (2013.01); *G06F 8/30* (2013.01); *G06F 8/61* (2013.01); *H04L 12/6418* (2013.01); *G05B 2219/2642* (2013.01)

(58) Field of Classification Search
CPC ........ G05B 19/0426; G05B 2219/2642; H04L 12/6418; G06F 8/61; G06F 8/30
(Continued)

(56) References Cited

U.S. PATENT DOCUMENTS 5,555,416 A * 9/1996 Owens ................. G06F 8/61
 713/100
6,061,602 A * 5/2000 Meyer ............. G05B 19/0426
 700/83
(Continued)

FOREIGN PATENT DOCUMENTS

EP 2814207 A1 12/2014

OTHER PUBLICATIONS

International Search Report for Application No. PCT/FR2016/051328.
Written Opinion for Application No. PCT/FR2016/051328.

*Primary Examiner* — John Q Chavis
(74) *Attorney, Agent, or Firm* — Cantor Colburn LLP

(57) ABSTRACT

The present invention concerns a method for generating a conditional software code module and a method for monitoring at least one home automation installation of a building, the home automation installation comprising a plurality of home automation devices, each home automation device is represented by at least one instance of a generic device model and at least one instance of a low-level device model. The generation method being executed by a management unit connected to the at least one home automation installation and comprising a step of determining a state conversion, converting state variables between the low-level model and the generic model.

20 Claims, 8 Drawing Sheets

(51) Int. Cl.
*G05B 19/042* (2006.01)
*H04L 12/64* (2006.01)

(58) Field of Classification Search
USPC .......................................................... 717/107
See application file for complete search history.

(56) References Cited

U.S. PATENT DOCUMENTS

| | | | | |
|---|---|---|---|---|
| 7,206,643 | B2* | 4/2007 | Ruutu | G05B 15/02 |
| | | | | 700/83 |
| 8,561,058 | B2* | 10/2013 | Laska | G06F 11/3664 |
| | | | | 717/172 |
| 9,080,782 | B1* | 7/2015 | Sheikh | F24F 11/00 |
| 2002/0133581 | A1 | 9/2002 | Schwartz et al. | |
| 2009/0072991 | A1 | 3/2009 | Hayashi et al. | |
| 2010/0004763 | A1 | 1/2010 | Murakami et al. | |
| 2013/0219438 | A1* | 8/2013 | Arling | H04L 12/2805 |
| | | | | 725/93 |
| 2014/0359042 | A1* | 12/2014 | Fenley | H04L 12/6418 |
| | | | | 709/208 |
| 2015/0054947 | A1* | 2/2015 | Dawes | G08B 13/19682 |
| | | | | 348/143 |

* cited by examiner

METHODS FOR GENERATING A CONDITIONAL SOFTWARE CODE MODULE, AND METHOD FOR CONTROLLING AT LEAST ONE HOME AUTOMATION SYSTEM FOR A BUILDING

CROSS REFERENCE TO RELATED APPLICATIONS

This application is a National Stage of PCT Application No. PCT/FR2016/051328 filed on Jun. 3, 2016, which claims priority to French Patent Application No. 15/55076 filed on Jun. 4, 2015 the contents each of which are incorporated herein by reference thereto.

TECHNICAL FIELD

The present invention concerns a software code generation method for monitoring a home automation installation, a method for configuring, controlling and/or supervising a home automation installation.

BACKGROUND

It is known to proceed with the control and/or supervision of a home automation installation via a plurality of communication protocols.

Thus, the non-exhaustive list of protocols to be considered for the control and/or supervision of an installation comprises: Z-Wave, EnOcean, IO Homecontrol Somfy RTS, KNX, MODBUS, Wavenis, Philips HUE as well as other proprietary protocols.

The protocols commonly used have significant differences. In particular, the different protocols may provide logical partition mechanisms of the devices which are different. Thus, a physical device with multiple functions can be modeled as a single logic device or a plurality of logic devices.

A device may be, according to its type, in different states. For example, a state may correspond to on or off for a switch, or to a degree or percentage of opening for a shutter. The description of the states of the devices can be generic or specialized, depending on the local protocol. The identifiers of the state variables can be numeric or alphanumeric. The values of the state variables can use formats or custom or proprietary scales.

The devices are able to interpret and execute commands. The description of the device commands can be generic or specialized, the identifiers of commands that can be numeric or alphanumeric. The commands can have parameters whose values can use formats or custom or proprietary scales.

Used local communications protocols may be unidirectional, bidirectional in the form of a request/response exchange or of a unidirectional double exchange using a factual approach. These protocols use a proprietary, usually binary, format.

Thus, the lack of standardization in the local communication protocols of devices makes difficult the remote control and the supervisory monitoring of heterogeneous home automation installations.

BRIEF SUMMARY

The present invention aims to solve all or part of the drawbacks mentioned above.

To this end, the present invention concerns a method for generating a conditional software code module intended to monitor at least one home automation installation of a building, the home automation installation comprising a plurality of home automation devices, each home automation device being represented by at least one instance of generic device model and at least one instance of low-level device model; the method being executed by a management unit connected to the at least one home automation installation and comprising the following steps:
  i. Receiving a generation message or a generation instruction of a conditional software code module instruction from a user or an application being executed on the management unit or another connected management unit, the generation message containing a generic conditional expression defining at least one condition evaluation relating to at least one generic state variable of at least one home automation device and optionally at least one conditional triggering of at least one action;
  ii. Determining the at least one generic device model instance representing the at least one home automation device;
  iii. Determining the at least one low-level device model instance corresponding to the at least one generic device model instance determined in step
  iv. Determining at least one low-level variable or at least one type of low-level state variable corresponding to the at least one generic variable and to the low-level device model instance determined in step iii or to a type of low-level device,
  v. Selecting a state conversion rule arranged to convert a value of the at least one low-level state variable into at least one value of the at least one generic state variable depending on the least one low-level state variable or on its type, the conversion rule being expressed in the form of software code snippet.
  vi. Generating a conditional software code module comprising the following sub-steps:
    a. generating at least a first software code snippet for the collection of the values of low-level state variables necessary for the evaluation of the generic conditional expression based on the at least one type of low-level state variable determined in step iv for the at least one low-level device model instance determined in step
    b. generating at least a second software code snippet for the conversion of the at least one value of the at least one low-level state variable necessary for the evaluation of the generic conditional expression into at least one value of generic state variable based on the at least one state conversion rule selected in step v;
    c. defining at least a third software code snippet for the evaluation of the generic conditional expression depending on the at least one value of the at least one generic state variable determined in step v;
  vii. A step of sending the conditional software code module comprising the first, second and third software code snippets to the central control unit of a home automation installation with a view to its execution on said central control unit, or
  A step of recording the conditional software code module comprising the first, second and third software code snippets on the management unit in a view to its execution on said management unit.

Thanks to the arrangements according to the invention, it is possible to obtain a simple generation of a conditional software code module. This generation does not require the use of a complex syntactic grammar or a complex syntactic processing. It simply should conduct an assembly of code snippets corresponding to the selected conversion rules, and to the collection of the values corresponding to the selected instances.

A conditional software code module includes a program or a program portion which associates at least one action, such as for example sending a command to perform by the home automation device and/or sending a notification to a user or an application being executed on the management unit, or even a request to launch a predefined script, to the fulfillment of a condition on one or more state variable(s). A programming of the conditions and the associated actions for the generic models allows performing this programming in a uniform manner for all installations. In this manner, it is possible to proceed with the generation of a conditional software code module intended for the monitoring of the home automation installation in a uniform manner regardless of the communication or control local protocol used to control the home automation devices.

The device generic model is an independent model of the protocol allowing functionally describing the devices of the building.

By using the state conversion rules, it is possible to evaluate a generic conditional expression of one or more generic state variable(s) depending on the values of low-level state variables.

In particular, the transformation of a low-level variable value into generic state variable value is carried out using a programming language expression comprising at least one state conversion rule. It is then possible to carry out the evaluation of the generic conditional expression itself depending on the values of the generic state variables.

The evaluation of this condition in the common language can be performed either on a management unit, such as a server, or on a central unit of a home automation installation after downloading on this unit. Indeed, the remote control central units see only pre-translated generic expressions and do not need elements of the reference model or the implementation of the abstraction layer to interpret the module.

According to an implementation mode, during step vi of the method, determining a type of low-level state variable can be achieved on the basis of a low-level variable instance. Alternately or complementarily, during step iv, determining a low-level variable instance can comprise determining an associated type of low-level state variable.

It is noteworthy that home automation device means a home automation equipment and/or a sensor, or even a home automation equipment portion or a sensor portion corresponding to a functional subset.

Moreover, message means a data item notified or received in the form a synchronous or asynchronous call to the management unit, which may also correspond to a local or remote function call.

Action means in particular triggering of the execution of a generic or low-level command relating to a least one home automation device or sending of a notification, or even the triggering of a predefined script or of the execution of a group of commands sent to the control unit beforehand, with a view to their execution by one or more home automation device(s). In the latter case, the action comprises sending an identifier of the predefined script or of the group of commands sent beforehand.

According to one implementation mode, each generic device model instance comprises an indication of belonging to a class or a type of generic device model.

According to one implementation mode, each low-level device model instance comprises an indication of belonging to a class or a type of low-level device model.

According to one implementation mode, each low-level device model instance comprises an indication of a local communication protocol type recognized by the home automation device.

The processing of information stored in this low-level model for a given device requires knowledge of the specific protocol and of the data format for this device. According to one aspect of the invention, this model can present a common structure format for different types of low-level devices, but the types of attributes, state variables and commands defined in this model are not generic.

The conversion between the generic model and the low-level model is performed on the basis of a set of predefined model conversion rules, which are in particular recorded on the management unit and allow providing an abstraction of the devices for the applications or the users.

According to one implementation mode, the management unit is a server remotely connected to the at least one home automation installation via a wide area network.

According to another implementation mode, the management unit is a central unit intended to be connected to one or more central control unit(s) on separate private or local area networks, or even on the same local area network.

According to one implementation mode, the selection of a state conversion rule depending on the low-level state variable is made based on the type of the state variable and of the type of low-level device.

According to one implementation mode, the state conversion rules are stored in association with the following data:
an identifier or a generic variable name;
a type of generic device;
an identifier or a name of low-level variable;

According to one implementation mode, a state conversion rule defines the correspondence between an identifier of a low-level state variable and an identifier of a generic state variable, as well as a conversion rule between the value of a low-level state variable and a value of a generic state variable.

According to one implementation mode, the method comprises a step of updating the value of the low-level state variable and of storing this value.

According to one implementation mode, the generic device model instances are only partially stored persistently. The values of the generic state variables are recalculated from the data of the instances of low-level models on the basis of the state conversion rules.

According to one implementation mode:
the at least one action comprises a generic command relating to a least one home automation device,
the method further comprises the following step:
vbis—Optionally selecting a command conversion rule converting the at least one generic command into at least one low-level command depending on the at least one generic command or its name and on the type of low-level device;
and the generation step vi further comprises the following sub-step:
d. optionally generating at least a fourth software code snippet for the definition of low-level commands corresponding to generic commands defined in the generic conditional expression on the basis of a command conversion rule selected in step vbis, the conversion rule being expressed in the form of a code or expression snippet of an interpretable language, or to the sending of a notification.

Thanks to these arrangements, the conditional software code module contains both the elements allowing evaluating the generic conditional expression, but also the elements allowing triggering the execution of generic commands after the evaluation of the generic conditional expression, depending on the result of the evaluation. This aspect is particularly useful for performing regulation functions, in which the choice of the commands, possibly the values of parameters associated with the commands, is/are defined depending on the values of the generic variables. These values are evaluated at the time of execution.

According to one implementation mode, the command conversion rules are stored in association with the following data:
- a type of low-level device;
- a name or identifier of generic command.

According to one implementation mode, the selection of the command conversion rule is performed by using the type of local communication protocol and the name or identifier of the generic command.

According to one implementation mode, the selection of the expression conversion rule is performed by using the type of local communication protocol and the name or identifier of the generic command.

According to one implementation mode, at least one software code snippet of the at least a first, second, third and/or fourth software code snippet is expressed in the form:
- a source code snippet in compilable programming language; or
- a precompiled code snippet for a virtual machine implemented on the central control unit or the management unit intended to execute the conditional software code; or
- a code snippet in interpretable programming language for a complementary software module, called interpreter, on the central control unit or the management unit intended to execute the conditional software code; or
- a binary code snippet, corresponding to a sequence of instructions in machine language compiled by the management unit for a target processor, intended to execute said binary code snippet.

According to the latter possibility, the features of the processor must be known in advance to execute this software code snippet, the entity which executes the code, for example the control unit, and the management unit having a programming interface allowing calling the generated code snippet.

According to one implementation mode, the at least one third software code snippet for evaluating the generic conditional expression comprises an at least partial copy of a condition comprised in the generic conditional expression.

The present invention also concerns a method for monitoring at least one home automation installation of a building, the home automation installation comprising a plurality of home automation devices, each home automation device being represented by at least one instance of generic device model and at least one instance of low-level device model; the method being executed by a management unit connected to the at least one home automation installation or by a central control unit of the home automation installation and comprising the following steps:
  i. Triggering the execution of a conditional software code module arranged to evaluate a generic conditional expression.
  ii. Collecting at least one low-level variable value identified in the conditional software code module.
  iii. Converting at least one low-level state variable value into at least one generic state variable value based on at least one state conversion rule integrated in the conditional software code module in the form of a code snippet;
  iv. Evaluating the generic conditional expression based on the at least one value of the at least one generic state variable obtained in step iii.

Thanks to the arrangements according to the invention, the execution of the conditional software code module can be performed on a management unit or a central control unit of a home automation installation. In case where the execution is performed on a central control unit of a home automation installation, this allows a distribution of the computational load between the elements of the home automation installation.

According to two implementation modes, the triggering step may be initiated either periodically upon the expiry of a computer meter or upon the detection of an event of the value change type of the at least one low-level state variable.

According to one implementation mode, the conditional software code module comprises
  a. at least one first software code snippet for the collection of at least one low-level variable value;
  b. at least one second software code snippet for the conversion of the at least one value of the at least one low-level state variable necessary for the evaluation of the generic conditional expression into at least one generic state variable value based on at least one state conversion rule;
  c. at least one third software code snippet for the evaluation of the generic conditional expression depending on the at least one value of the at least one generic state variable;
  d. and optionally at least one fourth software code snippet for the definition of low-level commands corresponding to generic commands defined in the generic conditional expression based on a command conversion rule;
  at least one software code snippet among the at least first, second, third and/or fourth software code snippet is expressed in the form of interpretable programming language, the management unit connected to the at least one home automation installation or the central control unit of the home automation installation executing the method also being arranged to execute an interpreter software module.

According to one implementation mode, at least one software code snippet is expressed in the form of a precompiled code for a virtual machine and, in a preliminary step, a loading of the conditional software code module is performed in a virtual machine executed on the management unit connected to the at least one home automation installation or on the central control unit of the home automation installation executing the method, the conditional software code module corresponding to a generic conditional expression.

According to one implementation mode, the method is executed by a management unit connected to the at least one home automation installation and further comprises the following steps:
  v. Evaluating a result of the generic conditional expression GCE and deciding whether to perform an action; then if the defined condition is met:
  vi. Sending a command message to the central control unit corresponding to at least one low-level command corresponding to at least one generic command defined in the generic conditional expression based on at least one command conversion rule; and/or vii. Sending at least one notification in the form of a notification message to a user or an application.

According to a variant of the method described above, in the case of sending a low-level command corresponding to a generic command, it is possible that the conversion of the generic command is not performed during the generation method. In this case, a command method taking into account this conversion may be used.

According to one implementation mode, the monitoring method is executed by the central control unit, and further comprises a step of sending to the management unit a message comprising the result of the step iv of evaluating the generic conditional expression based on the at least one value of the at least one generic state variable.

Such arrangements allow carrying out the execution by a central control unit in order to preserve the resources in the processing time of a management unit such as the server.

According to one implementation mode, the monitoring method according to any of the preceding claims, wherein the method is executed on a management unit connected to the home automation installation, and wherein the collection step ii of at least one low-level variable value is carried out by using a repository or instance database accessible to the management unit.

According to another implementation mode, the monitoring method according to any of the preceding claims, wherein at least the steps i to iv of the method are executed on the central control unit of the home automation installation, and wherein step ii of collecting at least one low-level variable value is performed by using values stored in the memory of said central control unit.

According to one implementation mode, the collection step uses a function which presents, in its parameters, identification elements, namely in particular a generic variable identifier, a used protocol type, these identification elements can be completed by an indication of an identifier of the electronic control unit.

The present invention also uses a configuration method of at least one home automation installation of a building, the home automation installation comprising a plurality of home automation devices, each home automation device being represented by at least one generic device model instance and at least one low-level device model instance; the method is executed prior to the execution of the code generation method by a management unit connected to the at least one home automation installation and comprising the following steps:

i. receiving a configuration message transmitted from a central control unit of a home automation installation or a user terminal, the message containing an indication of an activation, a configuration or a reconfiguration of a home automation device.

ii. determining at least a class or a type of low-level device model corresponding to the home automation device;

iii. creating at least one low-level device model instance depending on the class or type of low-level device defined in step ii and the corresponding to the home automation device.

iv. determining a model conversion converting one type or class of low-level device into at least one class or type of generic device model based on a model conversion rule selected depending on the low-level device model instance determined in step iii or on its type.

v. creating at least one generic device model instance for the at least one low-level device model instance base on at least one type or class corresponding to the model conversion determined in step iv.

According to one implementation mode, a recording of the generic device model instances is carried out in association with the low-level device model instance.

According to one implementation mode, the model conversion rules are stored in the form of an association between:
a type of low-level device; and
at least one type or class of corresponding generic device.

The present invention also concerns a computer program product comprising code instructions arranged to implement the steps of a method according to any one of the preceding claims, when said program is executed by a processor.

The present invention also concerns a system comprising a management unit arranged to execute one of the methods detailed above, being connected to a central control unit of a home automation installation.

The different incompatible aspects defined above may be combined.

BRIEF DESCRIPTION OF THE DRAWINGS

The invention will be better understood using the detailed description shown hereinafter with reference to the appended drawings in which.

DETAILED DESCRIPTION

In the detailed description which follows of the figures defined hereinabove, the same elements or the elements meeting identical functions will keep the same references in order to simplify the understanding of the invention.

Figure 1:
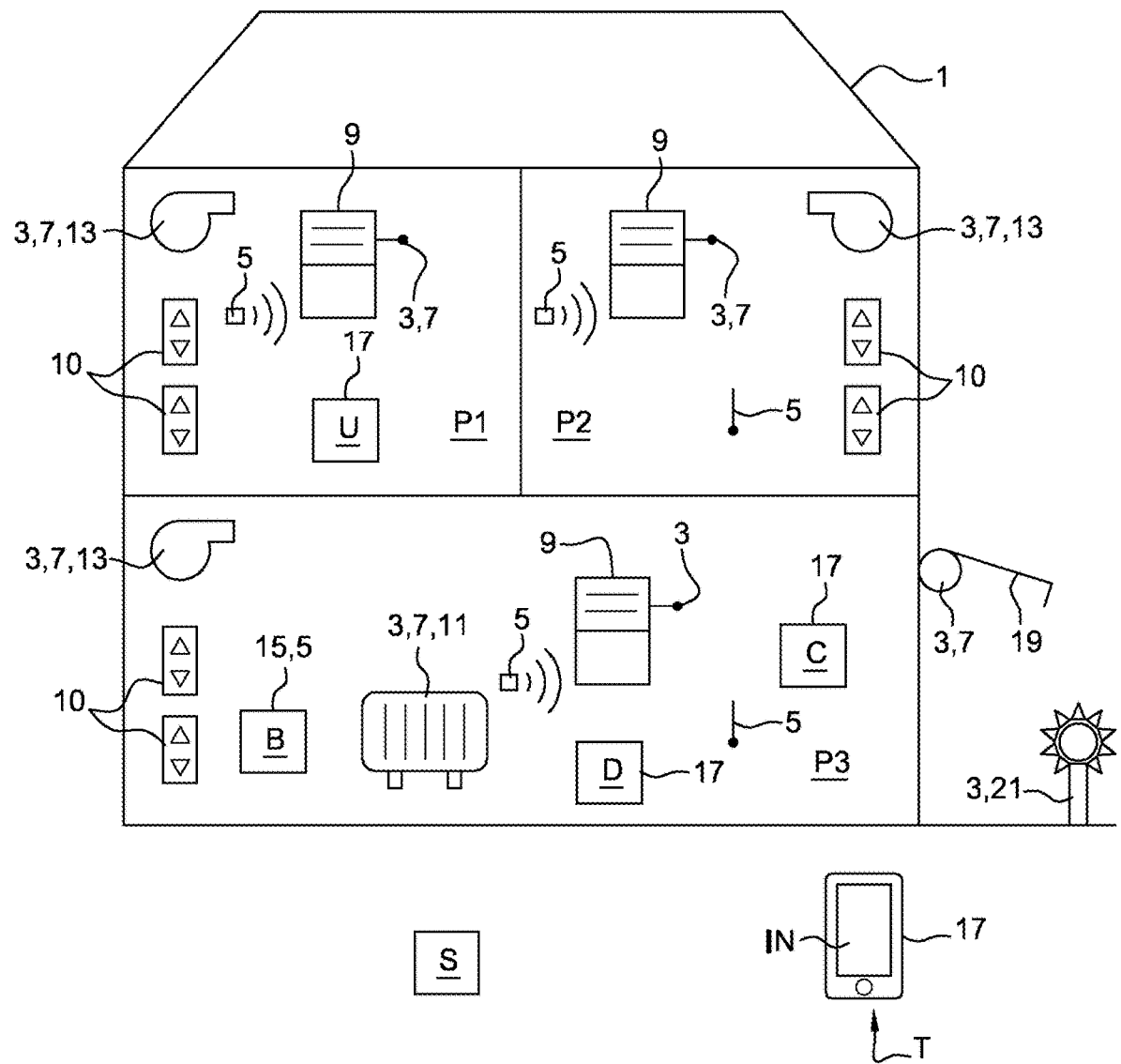
FIG. 1 is a schematic view of a building and a home automation installation in accordance with one embodiment of the invention.

As illustrated in FIG. 1, the building 1 comprises as example three rooms P1, P2, P3. The building 1 also comprises home automation equipments 3 and sensors 5.

Home automation equipment 3 may be an actuator arranged to displace or adjust an element of the building 1, for example an actuator 7 to displace a roller shutter 9 or a terrace awning 19, or a regulation system 10 for a heater 11 or an aeraulic system 13. Home automation equipment 3 can also be a lighting, such as for example a terrace outdoor lighting 21 or a lighting control system, or even an alarm system.

The home automation installation 17 can also comprise a control point 15 of an actuator 7, such as a wireless control box B for the roller shutter 9.

The home automation installation 17 may comprise one or more sensor(s) 5, in an integrated manner to an actuator 7, a control point 15 or even the control box B, or independently to these elements. A sensor 5 can, in particular, be arranged to measure a physical unit, for example a temperature sensor, a sunlight sensor or a humidity sensor. Sensors 5 of the position of home automation equipment 3 of the building 1 such as, for example, sensors of the open state of a roller shutter 9 or sensors of the position of a leaf opening such as a window, motorized or not, may also be provided. The home automation installation can also comprise one or more presence sensor(s).

A home automation equipment 3 and a sensor 5 are thus to be considered as units having available information on observed real states of elements of the building 1 and being capable of sharing this information with other elements of the home automation installation 17.

The home automation equipment 3 and the sensors 5 can have access to any measurable physical unit, such as the temperature of each room P1, P2, P3 or a state of an element of the building 1, such as the state of opening of a roller shutter 9, the state of an alarm, etc.

The home automation installation 17 comprises a central control unit U arranged to remotely control and/or monitor all or part of the home automation equipment 3, in particular by using a wireless communication protocol, for example a radio communication protocol. The central control unit is arranged to bring together the set of data coming from the home automation equipment 3 and to process this data.

The devices belong to a local area network within the home automation installation and communicate according to a local communication protocol. They have a local address in this network. The logic devices may be modeled as nodes or endpoints in the local area network.

The local addressing system can be hierarchical or flat, the address format can be numeric or alphanumeric.

Figure 2:
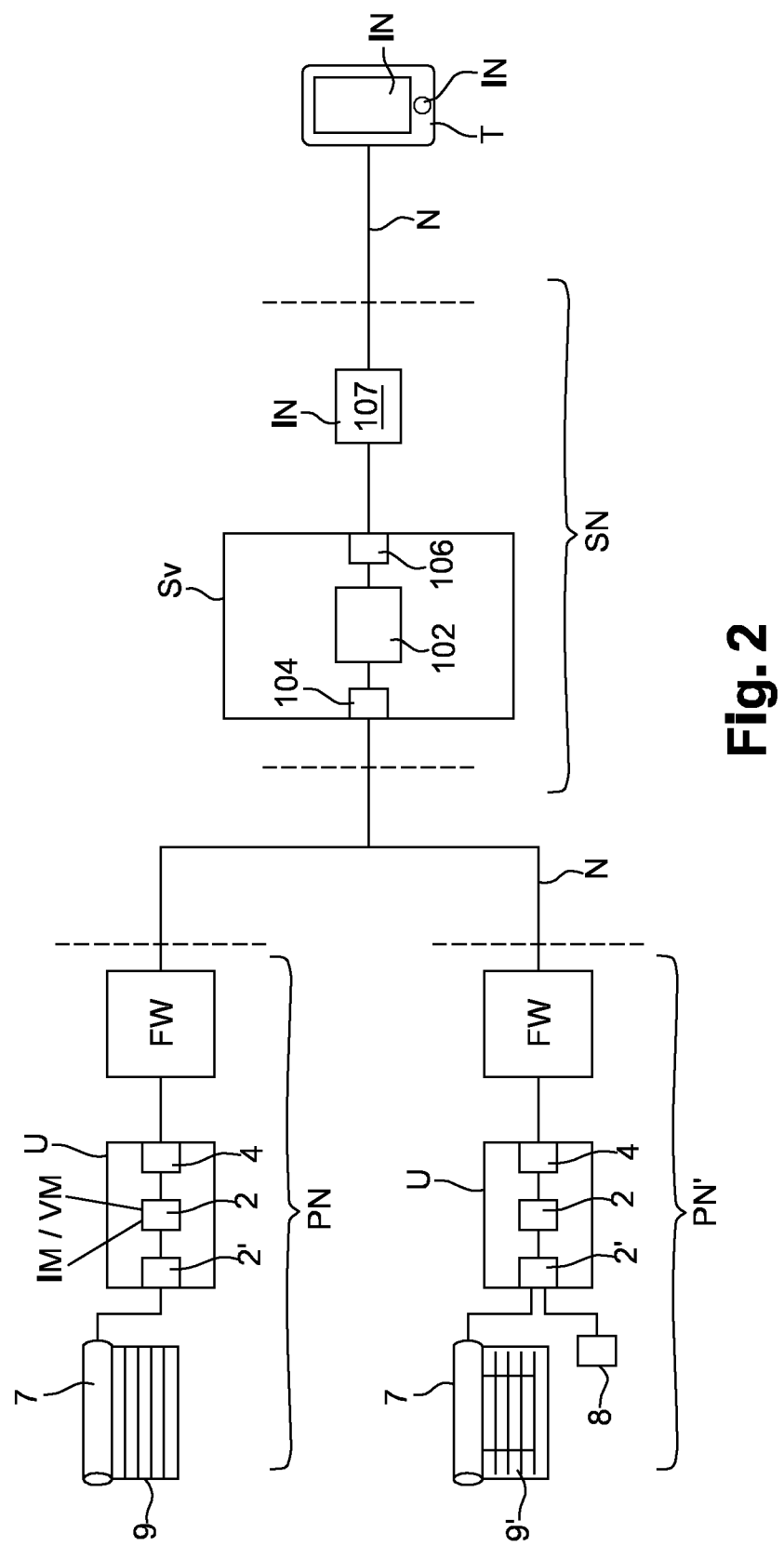
FIG. 2 is a diagram showing an architecture of a system comprising the home automation installation illustrated in FIG. 1 as well as a server intended to be connected to a user terminal.

As shown in FIG. 2, the central control unit U is arranged to communicate with a server Sv.

The central control unit U is arranged on a private network PN, PN', the access of which is generally protected by a firewall FW. The server Sv is also arranged on a private network SN. The private network PN is connected to a wide area network N, for example Internet.

In particular, the central control unit U of the home automation installation 17 comprises a processing unit 2 arranged to contain and execute a first computer program. FIG. 2 shows two central control units U arranged on two private networks corresponding to different home automation installations. Of course, the server Sv is arranged to communicate with a set of such central control units U. Hereinafter, we will describe one of these units.

As an example, the processing unit 2 comprises a processor, a storage flash memory as well as a random-access memory, and an Ethernet chip.

The central control unit U further comprises at least one communication module 2' intended to monitor and/or control home automation equipment 3 and/or sensors 5, the home automation equipment 3 may be actuators 7, lightings 21 or an alarm system.

As example, as shown in FIG. 2, the communication module 2' allows monitoring and controlling at least one actuator 7 of a movable element of the building 1, such as a roller shutter 9, or of an orientable sunshade 9' or of other actuators 7 or lightings 21, as previously described with reference to FIG. 1.

As example, the communication module 2' may be arranged to implement for example one or more of the protocols Z-Wave, EnOcean, 10 Homecontrol, Somfy RTS, KNX, MODBUS, Wavenis, Philips HUE.

The reception of information from a sensor 5 providing presence information of a user or values of the surrounding parameters, such as the temperature, the humidity and the brightness, is also provided. Similarly, the central unit U may enable monitoring and/or controlling an alarm system.

Each central control unit U further comprises a communication module 4 with the server Sv. The server Sv allows the remote control and/or monitoring and comprises one or more processing unit(s) 102 arranged to contain and execute a second computer program.

The server Sv further comprises at least one communication interface 104 intended for the communication with the central unit U.

The server Sv may also comprise a communication interface 106 intended for the communication with a control and/or monitoring interface IN allowing a user to remotely monitor the home automation installation.

It should be noted that the term server is a logical designation which can cover the use of several physical servers to distribute the computer processing load to be carried out.

The control and/or monitoring interface IN comprises, for example, a web server 107 and a mobile communication terminal T communicating via the wide area network N. The mobile communication terminal T can be, for example, a smartphone or a tablet.

The control and/or monitoring interface IN comprises a processor which can be arranged at the web server 107 and/or the mobile communication terminal T.

The control and/or monitoring IN interface processor is arranged to use a third computer program. This third computer program is in turn arranged to execute a downloadable application.

The mobile communication terminal T comprises a data input device and a display device, for example in the form of a part of a touch control of a screen of the terminal T and in the form of one or more button(s) of the terminal T.

Figure 3:
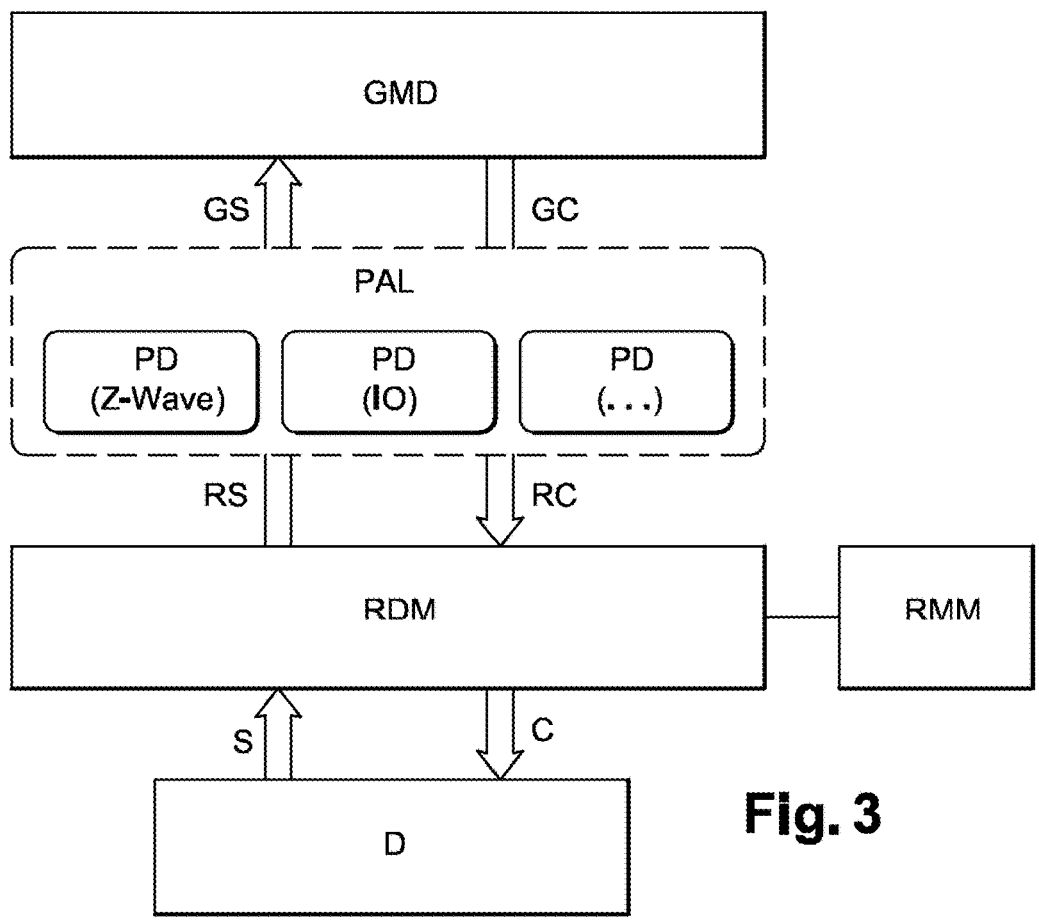
FIG. 3 is a diagram showing an abstraction system of the home automation devices.

According to one aspect of the invention, and as shown in FIG. 3, the processing unit of the server 102 is arranged to implement an abstraction system intended to the control and/or monitoring of the devices, home automation equipment or sensors. Afterwards, we will use the device D designation indifferently to designate sensors or home automation equipment, or even parts of home automation equipment 3 or of sensors 5.

As shown in FIG. 3, the proposed abstraction system implements:

A plurality of models of low-level devices RDM intended to store information in a specific format of a protocol on a given actual device D, only one model being shown in FIG. 3;

A plurality of high-level generic device models GDM allowing the description of the real devices D, of their states S and the commands C in a protocol-independent manner, only one model is shown in FIG. 3, and A plurality of protocol drivers PD which implement the necessary conversions to switch from one model to another and form a protocol abstraction layer PAL.

Figure 4:
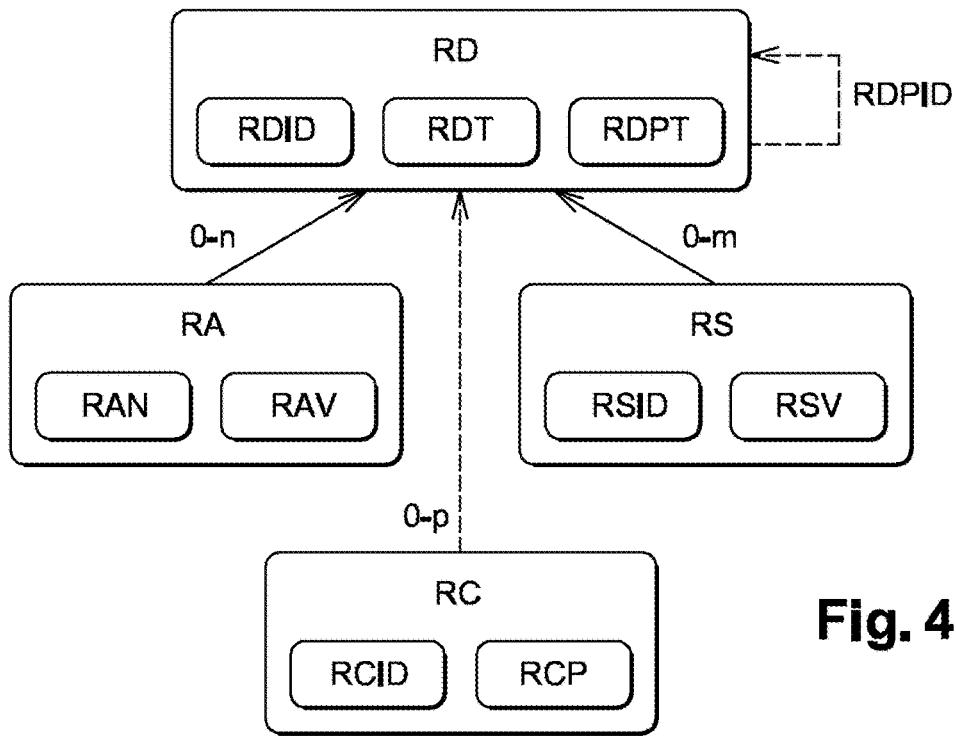
FIG. 4 is a diagram showing a low-level device model.

As shown in FIG. 4, the low-level device model allows the storage of information on the devices and their state, in a format similar to their communication protocol native format.

The processing of the information stored in this model for a given device involves knowledge of the specific protocol and the data format for this device. According to one aspect of the invention, this model can present a common structure format for the different types of low-level devices, but the types of the attributes, state variables and commands defined in this model are not generic.

Each instance RD of a low-level model RDM corresponds to an addressable node in the local area network to which it belongs and in which it communicates according to the target protocol. The node acts as a termination. Such a node may correspond to a physical device, a part of a device (a functional sub-set).

An RD instance of a low-level model comprises:

An identifier of the low-level model instance RDID, which may comprise in particular a termination address in the local area network.

a type or class of device RDT;

a type of protocol RDPT used in the local area network.

The identifier RDID or address is used as a communication address or as a routing path. This address is unique, at least in the local area network to which the device D belongs.

The RDT type information can be obtained directly from the home automation device D, but it may be necessary to use external reference tables or even information provided by a user to know the exact type of device. In case where this information is requested from the user, this RDT information may be requested only once to the user during the configuration/peering phase of the product and then stored in the instance RD, in particular in the database IDB which will be described later on.

Moreover, each low-level model instance RD may have:

One or more attribute(s) RA;

One or more state variable(s) RS;

An attribute RA is in particular defined by an attribute name RAN and by a value RAV. The attributes RA represent for example additional information of a type and/or configuration obtained for example during the peering phase. The attributes are in particular invariable information after the peering.

The state variable RS is in particular defined by a unique identifier RSID in the range of the considered low-level device model RDM, and by a value RSV. The low-level device model instances RD presenting state variables RS may permit requests on their state and/or send notifications when the value of the state variable RSV changes.

A low-level device model instance RD may also include a parent address RDPID. The parent address RDPID allows the low-level device model instances RD of the same protocol to be organized in a hierarchical node tree. This is useful for the protocols in which the hierarchical topology is required for the routing of information to the nodes, or in the case where a device cannot exist without parent.

Thus, all instances RD of an installation 17 may form a list or a tree of nodes, in the case of a hierarchical topology, according to the used protocols.

As indicated in FIG. 3, a reference meta-model RMM is maintained to store common information on the low-level device models RDM, their state variables RS and the attached commands RC, namely:

The types of supported low-level devices RDT and their names;

The supported low-level state variables RS with their identifiers RSID and their types of data for the values RSV;

The profiles describing the relationship between the types of low-level device models RDM and the authorized state variable values RS.

This reference meta-model RMM is shared in the architecture to allow the verifications of integrity and a proper management of the values of state variables RSV of the low-level device model instances RD when the knowledge of the data type is necessary, without the need to store this information for each low-level device model instance RD.

Figure 5:
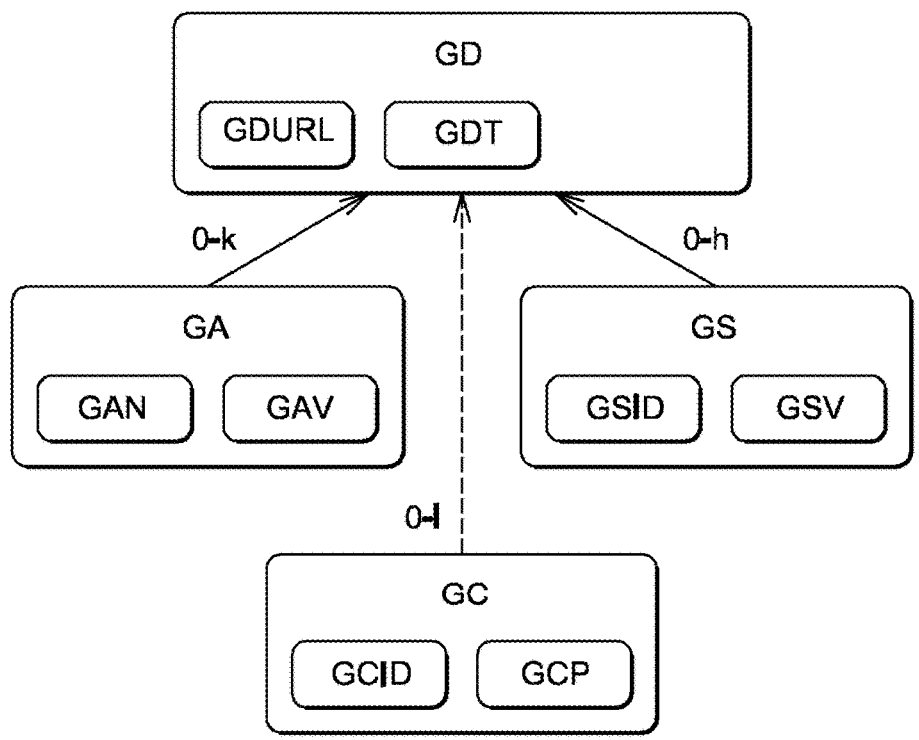
FIG. 5 is a diagram showing a generic device model

As shown in FIG. 5, the generic device model GDM is a protocol-independent model allowing functionally describing the devices of the building.

In particular, a generic device model instance GD comprises:

A unique identifier of the generic model instance GDURL, which may be constituted in particular by an identifier using in particular address notation independent of the protocol, for example according to a URL-type format;

A type or class of generic device GDT;

Moreover, each generic model instance GD may have:

One or more attributes GA;

One or more state variables GS.

An attribute GA is in particular defined by an attribute name GAN and by a value GAV. The attributes GA represent for example additional information of a type and/or configuration obtained for example during the peering phase.

A state variable GS is in particular defined by an identifier or a unique name GSID within the scope of the considered generic device model GDM, and by a value GSV. The generic device model instances GD having state variables GS may permit requests on their state and/or send notifications when the value of the state variable GSV changes.

A generic device model instance GD may have at least one state variable GS. This state variable GS has an identifier or an explicit state name GSID predefined by the considered model, and a state variable value GSV, selected from several predefined values or belonging to a range of state variable values predefined by the considered model.

In addition, a generic device model instance GD can be associated with one or more generic command(s) GC with:

An explicit command name GCID, and

One or more standardized parameter(s) GCP.

The supported commands are defined by the generic device model GDM.

This description is independent of the actual protocol or the implementation details of an underlying low-level device model RDM.

As example, a roller shutter can be modeled by a generic device model instance GD defined as follows:

Class or Type GDT: «PositionableRollerShutter»;

State variable GS: «ClosureState» which can take values according to a standardized scale from 0 to 100%;

Supported generic command GC «SetClosure» with an opening parameter (amount) which can take values according to a standardized scale from 0 to 100%.

A generic device model instance GD is implicitly connected to at least one underlying low-level device model instance RD. In practice, this connection can be modeled by the unique identifier of the generic model instance GDURL which corresponds to a device address, and which acts both as unique identifier and pointer to the underlying low-level device model instance RD. The realization of the connection or the index key will be detailed hereinafter.

It should be noted that in some cases, a low-level device model instance RD can correspond to several high-level model instances GD.

This is in particular the case due to the fact that the functional coverage of a low-level device model can be different according to the considered protocols. Thus, a low-level device model can cover either a single function, or multiple functions of a complex system. As example, a heating system can functionally cover on/off/setting commands of the heating which corresponds to a first instance of a generic device model GD of the «heating system» type. This system can also comprise one or more temperature sensor(s), possibly located at distinct positions of the home automation installation which can correspond to the instances of another generic device model GD relating to a «sensor» type or class.

The designed abstraction system allows modeling several instances of generic device models GD based on the same actual device and on the same underlying low-level device model instance RD.

In such a case, the generic device model instances GD relating to the same low-level device instance RD can be called sub-systems.

In the case where several home automation devices D are grouped, in their native protocol, for example in the case of a shutter assembly of a facade of a building, it is possible to create a virtual low-level device model instance RD, to represent the group in a format close to its native protocol, then to connect this virtual low-level device model instance RD to one or more generic device model instances GD. In this manner, it is possible to keep a correspondence between at least one generic device model instance GD and a low-level device model instance RD.

The structure of the unique identifier of the generic model instance GDURL will be now described correspondingly to a particular embodiment.

According to this embodiment, the unique identifier of a generic model instance GDURL comprises information on:
The local native protocol of the home automation device D;
The communication path to the device D, including the intermediate central control units U and the termination addresses to pass through, organized or not in a hierarchical topology;
A sub-system identifier subsystemId if the device belongs to a group of generic device model instances GD associated with the same underlying low-level device model instance RD. The identifiers which are a unique expression of a low-level device model instance GD does not have any identification extension of a subsystem.

Thus, the form of the unique identifier of the generic model instance GDURL can be the following:
<Protocol>://<gatewayId>/<rawDeviceAddress>(#<subsystemId>)
In which the following fields are present:
protocol: identifier of the native device local protocol;
gatewayId: identifier of the first central control unit U, for example as a serial number or a unique identifier.

rawDeviceAddress: a simple of multi-level path. Its meaning and its format depend on the addressing scheme of the local communication protocol of the device D.
subsystemId: this optional field indicates an identification, for example a rank of the subsystem (for example starting from 1), if such a subsystem is present.

EXAMPLES 1) knx://0201-0001-1234/1.1.3
This unique identifier of a generic device model instance GDURL corresponds to a device D communicating by the protocol KNX with an individual address 1.1.3 accessible by the central control unit U bearing the identifier ID #0201-0001-1234.

2) io://0201-0001-1234/145036#2
This unique identifier of a generic model instance GDURL corresponds to a subsystem bearing the number 2 associated with a device D communicating by the protocol io homecontrol with a radio address 145036 accessible by the central control unit U bearing the identifier #0201-0001-1234.

Handling the different instances of low-level device models RD and of generic devices GD are made by a process or execution service ES. In order to store the different model instances mentioned above, the execution service can have access to an instance database IDB. Of course, these different types of instances can also be stored separately. Moreover, database here means an appropriate storage mode for a set of instances which can be stored in a list, a tree or tables or any other appropriate data structure.

An embodiment of the database IDB will now be described. According to this embodiment, the database IDB may contain tables organized in the form of tables. Each line corresponds to a low-level RD or generic GD home automation device model instance, according to the considered table. The columns correspond to different types of stored information.

Thus, an RDTbl table of the low-level device model instances RD can contain columns comprising the following data:
I. the identifier of the central control unit U to which a home automation device is attached UID;
II. the address of the home automation device in the local area network managed by central control unit RDID;
III. the type of used local protocol RDPT;
IV. the type of low-level device model RDT, corresponding for example to a designation of roller shutter or even of lighting.

An index key RDK, unique for each home automation device, is used. This unique index key RDK can be generated from the three elements I, II and III listed hereinabove; it can be stored in each table. Another possibility is to use as an index key RDK, an identifier which is auto-incremented as and when entering data in the database IDB.

According to yet another possibility, the index key RDK can be calculated at each access, starting from elements I, II and possibly III.

In general, in the case where the index key is calculated, this calculation may be based on identification elements. The combined identification elements must allow the identification of a unique low-level home automation device RD.

It should be noted that the different identification elements, taken individually, are not necessarily unique for each device, but the combination of two or more information elements has to be. The identifier UID of the central control unit U to which the home automation device D is attached or the address RDID of the home automation device, or possibly the one of its parent in a hierarchical addressing system in the local area network managed by the central control unit U are examples of identification elements mentioned above.

These two elements are sufficient for an identification without ambiguity of the home automation device. Other identification elements can be used, for example the type of local protocol used by the device. This additional identification element allows the quick selection of the concerned instances RD, GD, and of the protocol driver PD to be executed, since a protocol driver PD is specific to a native protocol type.

It should be noted that, in the case where the index key is calculated at each access, the same information can be present in the identification elements in different formats.

An example of table line RDTbl is reproduced below.

| UID | RDID | RDPT | RDT |
|---|---|---|---|
| 0201-0001-1234 | 120403 | IO | 0 × 0100202 |

This line corresponds to a table in which the index key RDK is calculated and not stored, for a device connected to a central control unit bearing the identifier 0201-0001-1234, the device being identified by its radio address IO 120403 on the local area network IO, the type of used local protocol being homecontrol IO, the low-level device model type being 0x0100202, which corresponds according an implementation to a roller shutter with low-speed management of the manufacturer SOMFY.

Other information, such as the name of the state variables RSID, the values of the state variables RSV, binary indicators (TRUE/FALSE) for commands under execution, etc. can be stored in different tables or in the same table. If different tables are used, the unique index key RDK for each low-level device model instance RD ensures the correspondence between the stored information and the concerned device.

A table GDTbl of the generic device model instances GD may comprise columns including the following data:
I. the unique identifier of a generic model instance GDURL;
II. the class or type of generic device GDT.

Thus, an example of table line GDTbl, corresponding to the example previously illustrated of table line RDTbl is reproduced below.

| GDURL | GDT |
|---|---|
| io://0201-0001-1234/120403 | RollerShutterWithLowSpeedSupport |

This line is relative to a generic device model instance GD corresponding to the low-level device model instance RD shown in the example of table RDTbl shown above.

Other information, such as the name of the state variables GSID, the values of the state variables GSV can be stored in different tables or in the same table. It may be interesting to associate other information to the generic device GD model instance, as a name, a physical location of the device D in the installation. However, this information may not necessarily be detected and is typically defined by the installer or user.

A unique index key GDK, representing a given home automation device, can be stored in the table.

As for the table of low-level instances, the index key can be calculated at each access. To access the table of generic model instances, it may be useful to calculate this key GDK from the identifier GDURL, for example by directly using the identifier as key.

The instances of low-level RD and generic GD models are calculated and/or stored with the same index key value GDK or RDK, by possibly adding a subsystem identifier where several generic device GD instances correspond to a single low-level device model instance.

According to one implementation mode, the generic device GD mod& instances are only partially stored persistently, Thus, only the device identifiers GDURL and the classes or types GDT have persisted. The attributes GA and the state variables GS are recalculated from the data of the low-level model instances as will be described later on.

The protocol drivers PD identified in FIG. 3 will be now described. The protocol drivers implement the central logic of the abstraction layer, namely the various conversion rules between the two generic and low-level models. There may be a protocol driver PD per of supported protocol, although different drivers may share common features, by capitalizing on existing implementations.

Each protocol driver PD can achieve a set of conversion operations. In order to achieve the different conversions mentioned below, a protocol driver can be associated with a conversion rule database GDI comprising different types of conversion rules mentioned below, namely model conversion rules MCR; state conversion rules SCR; command conversion rules OCR, Of course, these different types of rules can also be stored separately. Moreover, database means herein an appropriate storage mode for a set of rules, which can be stored in a list, a tree or tables or other appropriate data structure. It should be noted that the conversion rules MOR, SCR, CCR are stored or saved independently of the instances, but only depending on the types of device models. Such arrangements allow limiting the volume of information relating to the conversions which are not duplicated for each model instance.

In particular, a protocol driver PD can perform a model conversion CvM, that is to say the determination or selection of a class or type of generic device GDT, or a list of classes or types of GDT from a given low-level device RD model instance based on at least a model conversion rule MCR. If the low-level device RD model instance needs to be represented by several generic device GD model instances, the driver will return a list of such subsystems as model conversion CvM. In particular, the selection of a generic device class can use a type of low-level device RDT model instance but might also use other attributes in the selection process. This is useful for example for modular devices for which an optional function may be present or not. For example, the optional presence of an additional sensor for a heating system.

According to one embodiment, the protocol driver PD can perform the determination of the type or class of generic device GDT model by consulting a table MTbl of its database ROB. As example, the table MTbl may comprise columns comprising the following data:
a type of low-level device ROT
at least a type or class of corresponding generic device GDT.

Two examples of GDT type selection are described below,

Example 1

We assume that the discovered or configured low-level device RD instance is defined as described in the table below.

| RDPT | RDDT | RA | RDID |
|------|----------|----|--------|
| IO | 0x0100202 | — | 120403 |

This line corresponds to a device identified by its radio address IO 120403 on a local area network IO managed by a central control unit defined by the non-shown identifier UID, the used local protocol type being IO homecontrol, the type of low-level device model being 0x0100202, which corresponds according to an implementation to a roller shutter with low-speed support of the manufacturer SOMFY.

These data are provided as input to the protocol driver PD corresponding to the protocol IO. The protocol driver performs the determination of the type or class of generic device GDT model by consulting the table MTbl of its database ROB. The selection allows identifying an example of table line MTbl reproduced below.

| RDT | GDT |
|-----|-----|
| 0x0100202 | RollerShutterWithLowSpeedSupport |

Thus, the generic type of device is identified «RollerShutterWithLowSpeedSupport». In this example, the type of low-level device RDT is associated with only one type of generic device which corresponds to the model conversion CvM. There is no subsystem.

Example 2

We assume that the discovered or configured low-level device RD instance is defined as described in the table below.

| RDPT | RDT | RA | RDID |
|--------|---------|---------------------------|------|
| MODBUS | 0x00101 | 'sensorAvailable' = true | 4 |

This line corresponds to a device identified by its bus address MODBUS 4 on the local area network MODBUS, the used local protocol type being MODBUS, the low-level device model type is 0x00101, which corresponds according to an implementation to a heating system with an optional outdoor temperature sensor.

These data are provided as input to the protocol driver PD corresponding to the protocol MODBUS. The protocol driver performs the determination of the type or class of generic device GOT model by consulting the table MTbl of its database RDB. The selection allows identifying an example of table line MTbl reproduced below.

| RDT | GDT |
|-----|-----|
| 0x00101 | HeatingSystemController<br>OutsideAirTemperatureSensor (only if attribute 'sensorAvailable' = true) |

Thus, the identified generic device GDT types are:
«HeatingSystemController»;
and
«OutsideAirTemperatureSensor».
In this example, the low-level device type ROT is associated with two types of generic device which correspond to the model conversion CvM. Thus, the low-level model device RD instance will be associated with both generic device GD model instances which form two subsystems, namely a main controller and a sensor. In this example the sensor is optional but is present on the considered particular device. the sensor was not present, for example because it was not installed, the protocol driver would have returned only one corresponding type then to a single subsystem, namely the main controller.

A protocol driver PD may also proceed to the determination of one or more low-level state variable(s) RS corresponding to a generic state variable GS, a protocol driver can also provide a rule allowing determining the values GSV of the generic state variables GS of a generic device model type GDT from values RSV of low-level state variables RS corresponding to a given identifier RSID. In particular, the conversion rule SCR can be defined as an expression or a code snippet of an interpreted programming language which applies to a value of a variable identified by an identifier RSID. Alternatively, this rule can be defined as a precompiled code snippet for a virtual machine, or even a binary code snippet, compiled for the processor intended to execute this code (library).

According to one embodiment, the protocol driver PD can perform the determination of a state conversion rule SCR of a low-level state variable RS into one or several generic state variables GS by consulting a table STbl of its database RDS. For example, the table STbl may comprise columns comprising the following data:
an identifier or name of a generic state variable GSID;
a generic device type GDT;
an identifier or name of low-level variable RSID;
a state conversion rule SCR between the value of a low-level state variable RSV and a value of a generic state variable GSV.

Two examples of state variable conversion are described below.

Example 1

We assume that generic conditional expression GCE defined by a user relates on a generic state variable GS identified by its identifier GSD of a generic device model instance identified by its identifier GDURL defined as described in the table below.

| GDURL | GDT | GSID |
|-------|-----|------|
| modbus://1234-5678-0000/1234 | HeatingSystem | RegulationModeState |

Therefore, this generic state variable GS is a variable of the type «RegulationModeState» corresponding to the regulation mode of a generic device model instance «heatingSystem» of a device of the heating system type.

It can be deduced from the identifier GDURL, or by querying the database IDB to identify the corresponding low-level device model instance, that the communication protocol used by the corresponding device D is the protocol MODBUS.

The protocol driver PD of the protocol MODBUS can on that basis select a state conversion rule SCR or conversion expression using the name or identifier of the low-level state variable RSID.

The selection allows identifying an example of table line STbl reproduced below.

| GSID | GDT | RSID | SCR |
|---|---|---|---|
| RegulationModeState | HeatingSystem | 0x0C213 | if (v == 123) then return 'auto' else return 'manual' end; |

Thus, the state conversion rule for the identified generic state variable is a type of code snippet «if (v==123) then return 'auto' else return 'manual' end», this snippet applying to a low-level state variable value (represented here by the letter v) identified by its RSID «0x0C213».

Example 2

We assume that a generic conditional expression GCE defined by a user relates to a generic state variable GS identified by its identifier GSID of a generic device model instance identified by its identifier GDURL defined as described in the table below.

| GDURL | GDT | GSD |
|---|---|---|
| io://1234-5678-0000/101 | TemperatureSensor | TemperatureState |

This generic state variable GS is a variable of the type «TemperatureState» corresponding to the measured temperature of a generic device model instance «TemperatureSensor» of a temperature sensor type device.

It can be deduced from the identifier GDURL, or by querying the database IDB to identify the corresponding low-level device model instance, the communication protocol used by the corresponding device D is the protocol IO. The protocol driver PD of the protocol IO can on this basis select a state conversion rule SCR or conversion function using the name or identifier of the low-level state variable RSID.

The selection allows identifying an example of table line Stbl reproduced below.

| GSID | GDT | RSID | SCR |
|---|---|---|---|
| TemperatureState | TemperatureSensor | 0x14 | return v/51200; |

Thus, the state conversion rule for the identified high-level state variable is a code snippet or expression of the type «v/51200», this snippet applying to a low-level state variable value (represented here with the letter v) identified by its RSID «0x14».

A protocol driver can also determine a conversion of a generic command GC associated with a generic device GD model instance into one or more low-level command(s) RC specific to the protocol to execute on the actual device D, based at least on one command conversion rule OCR. For example, the command described above setClosure (p %) can have different translations depending on the protocol of the low-level device RD and its type RDT, and sometimes the particular configuration of the device. This conversion is implemented in the protocol driver corresponding to the local communication protocol used by the home automation device. In particular, this conversion rule CCR can be defined as a code expression or snippet of an interpretable language, associated with a of low-level device ROT type.

Thus, to convert a generic command GC into a low-level command RC or a combination of low-level commands RC, it is appropriate to proceed to:

a recognition of the target low-level device model instance RD, via the identifier of provided generic device model instance GDURL; then a determination of the conversion to be performed based on the low-level device type corresponding to the selected instance RD using a command conversion rule CCR or conversion function.

In most cases, the protocol driver only uses the low-level device RDT type, but in some complex cases, the value of some attributes may be necessary to completely determine the low-level command to generate. In such cases, the protocol driver can access the required attributes using the central control unit identifier UID and the low-level device instance identifier RDID.

The generic command GC can have parameters, in which case they will be transmitted with the conversion rule JIRO. The conversion rule CCR can also use contextual information such as the expected use of the command or the priority level of the command.

According to one embodiment, the protocol driver PD can perform the determination of a conversion of a generic command GC into one or more low-level command(s) RC by consulting a table CTbl and its RDB database. As example, the table CTbl may comprise columns with the following data:

a low-level device type RDT;

a name or identifier of generic command GCID;

a command conversion rule CCR or conversion function.

Two examples of generic command conversion GC are described below.

Example 1

We assume that the considered generic command GC is defined as described in the table below.

| GDURL | GC |
|---|---|
| io://1234-5678-0000/120403 | setClosure(p) |

This command corresponds to a command to a roller shutter communicating in IO with a radio address 120403 in the local area network managed by the central control unit having the identifier 1234-5678-0000, to close at p %, p is a parameter representative of a closure percentage.

Initially, it is appropriate to determine the generic device model instance, using the address comprised in the GDURL, and then, based on recordings which associate the corresponding generic instances GD and the low-level instances RD, to determine the corresponding low-level instance and its type. We assume that the ow-level device RDT type is 0x0100202, which corresponds to a roller shutter with low-speed support of the manufacturer SOMFY.

The protocol driver can then proceed on this basis to the conversion, by selecting a command conversion rule CCR or conversion function by using the low-level device type RDT and the name or identifier of the generic command GCID.

The selection allows identifying an example of table line CTbl reproduced below.

| RDT | GCID | CCR |
|---|---|---|
| 0x0100202 | setClosure (p) | return createActivateFunc(p*51200) |

The command conversion rule CCR corresponds to the code expression or snippet «createActivateFunc(p*51200)» which corresponds to a low-level command RC of type 'Activate Func', specific to the protocol IO with a main parameter scaled from the generic parameter p. Here, the function «createActivateFunc( )» returns binary data intended to be used by a central control unit U to form the body (payload) of a radio frame IO.

Example 2

We assume that the considered generic command GC is defined as described in the table below.

| GDURL | GC |
|---|---|
| modbus://1234-5678-0000/4 | setTargetTemperature(p) |

This command corresponds to a command to a heating system in communicating in MODBUS with an address bus 4 in the local area network managed by the central control unit 1234-5678-0000 to adjust its thermostat on an instruction temperature of p° C.

Initially, it is appropriate to determine the corresponding low-level device model instance and its type, using the address comprised in the GDURL, and then, based on recordings which associate the generic instances GD and the corresponding low-level instances RD, to determine the corresponding low-level instance and its type. We assume that the low-level device type RDT is 0x00101, which corresponds according to an implementation to a heating system with an optional outdoor temperature sensor.

The protocol modbus driver can then on this basis determine the conversion, by selecting a command conversion rule CCR or conversion function using the low-level device type RDT and the name or identifier of the generic command GCID.

The selection allows identifying an example of table line CTbl reproduced below.

| RDT | GCID | CCR |
|---|---|---|
| 0x00101 | setTargetTemperature (with one parameter p) | return {createConfigurationModeCommand( ), createSetTargetTemperatureCommand (p)} |

The command conversion rule CCR corresponds to two low-level commands RC: the first command sets the device in configuration mode and the second command sets the target temperature using the value of the generic parameter p. Here, the functions «createConfigurationModeCommand( )» and «createSetTargetTemperatureCommand( )» return binary data specific to the protocol MODBUS intended to be transmitted on the bus of the device by a central control unit U to change the configuration of the heating system.

The description of the state conversion rules SCR, and/or the command conversion rules CSC as expressions or code snippets of an interpretable language allows in particular combining different expressions to obtain more complex expressions or performing calculations. It may be desirable depending on the implementation modes to interpret these expressions on a remote central control unit U for the execution of interpretable conditional code modules MCC as it will be described later on. In this case, a programming language interpretable by the remote central control unit must be used. An «interpreter» software module IM is used in this case. Furthermore, in order to capitalize on this implementation, it is desirable to select a language which can be also interpreted from the server side. In particular, an interpretable programming language supporting the anonymous closures may be selected to allow an easy aggregation of the expressions. As example, it is possible to use the language Lua1 which is adapted to an execution on embedded equipment. A modified implementation of LuaJ2 may be for example used on the server side to provide the desired scalability.

Alternatively, the state conversion rules SCR and/or the command conversion rules CSC may be presented:
- as source code in a compilable programming language: an additional compilation step for the target processor is necessary in this case.
- in precompiled form for a virtual machine; the virtual machine must be implemented on the entity Sv, U intended for executing the conditional software code and a loading of the conditional software code module CCM on the virtual machine must be performed prior to implementation.
- in binary or executable form, as a series of machine language instructions of the target processor; in this case, the conversion tables may contain the source code which is compiled by the management unit Sv, to a processor intended to execute the code; the characteristics of the processor must be known in advance; to be capable of executing software code snippet, the entity which executes the code, for example the control unit U or the management unit Sv must have the programming interface beforehand allowing calling the generated code snippet. The generated binary code/executable can be integrated as a library(ies), in the software executable by the control unit U. FIGS. 6 to 11 show modes of implementation of configuration methods, generation code, update, control and monitoring based on the system described above.

Figure 6:
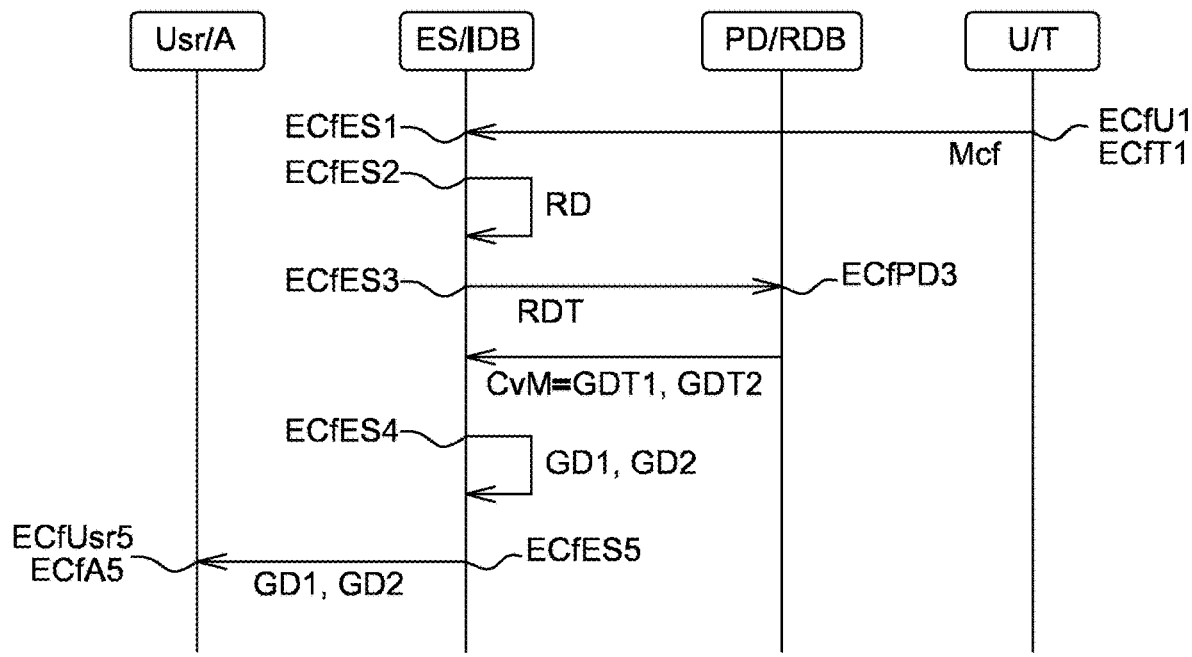
FIG. 6 is a diagram illustrating a mode of implementation of a method for configuring a home automation installation according to the invention.

A configuration method of at least a home automation installation 17 of a building 1 executed by a server Sv connected to the at least one home automation installation 17 will now be described with reference to FIG. 6.

Initially, the method comprises a reception step ECfES1 of a configuration message MCf transmitted from a central control unit U with a home automation installation 17, in a step ECfU1. The configuration message MCf contains an indication of a commissioning of a new home automation device D or an update/reconfiguration of a device installed beforehand.

According to an alternative, it is possible that the message MCf is issued by a terminal T of a user in a step ECfT1. For example, in the case of unidirectional protocols, the user can perform the commissioning, the configuration or reconfiguration/update of the device D on the location of the home automation installation and then send the information with his terminal T to initiate the configuration method. The method further comprises a creation step ECfES2 of at least a low-level device RD model instance representing the home automation device D. The low-level device model instance RD is stored in the database IDB accessible the execution service ES. In particular a line of the table RDTbl can be created as described above based on the information contained or deduced from the receipt of the message MCf. Indeed, the content of the message MCf or the information on its issuer allowing determining information about:

- the identifier of the central control unit U to which a home automation device is attached UID;
- the address of the home automation device in the local area network managed by the central control unit RDID;
- the used local protocol type RDPT;
- type of low-level device model RDT, for example corresponding to a designation of roller shutter or even lighting.

A determination step ECfS3 of a class or type of generic device GOT, or a list of classes or types GDT, from a given low-level device RD model instance is then performed, which corresponds to determining a model conversion CvM. This step is performed via a function call to the protocol driver PD which receives this call in a step ECfPD3 and which has the database of conversion rules RDB comprising mod& conversion rules MCR. If the low-level device RD model instance needs to be represented by several generic device GD model instance GD, the driver will return a list of such classes or types of subsystems GDT1, GDT2, as also described above, A step ECfES4 of creating the at least a generic device model instance GDI, GD2 for at least a low-level device RD model instance is then performed based on the determined types or classes GDT1, GDT2 in step ECfES3. The instances of generic device models GD1, GD2 are stored in the database IDB, for example in a table GDTbl as previously described. The connection between a low-level device RD model instance and one or more generic model instance(s) GD1, GD2 can in particular be performed by the identifiers GDURL or the index keys GDK and RDK as previously described.

The method may comprise a subsequent step ECfES5 of the user notification on the configuration of a new device D, in a requested manner or not by the user who receives the notification in a step ECfUsr5. It is also possible to proceed to the notification from another application A executed on the Sv server which receives this notification in a step ECfA5.

The configuration method is performed during the commissioning, the configuration or reconfiguration of a home automation equipment D.

Figure 7:
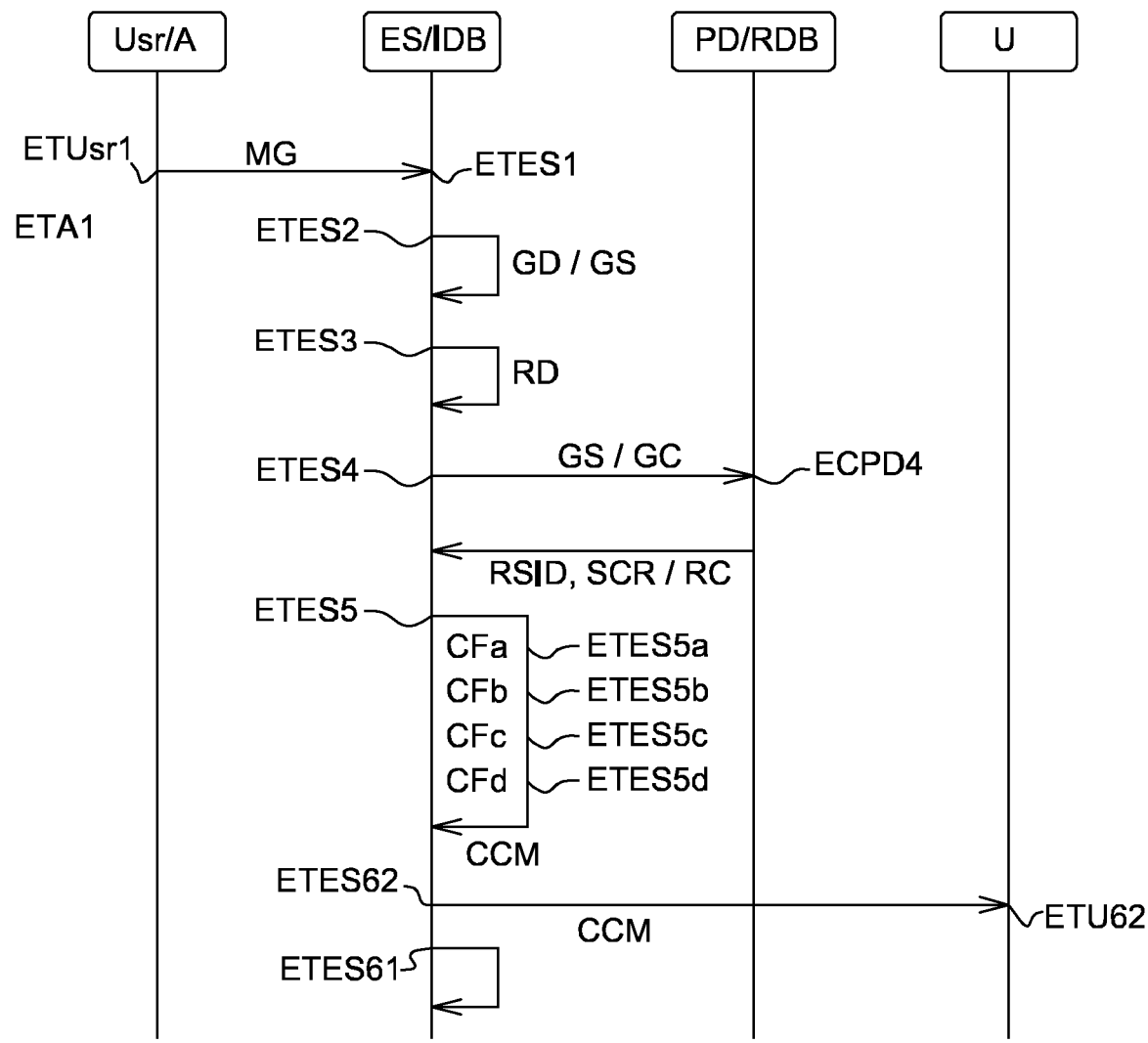
FIG. 7 is a diagram illustrating a mode of implementation of a code generation method according to the invention.

A generation method of a conditional software code module CCM intended for the monitoring of at least a home automation installation 17 of a building 1 executed by a server Sv connected to the at least one home automation installation 17 will now be described with reference to FIG. 7. We will assume that the generation method of a conditional software code module is performed subsequently to the configuration method described above. Thus, the instances of low-level device RD models and the corresponding generic device GD models instances are stored in association in a database of instances IDB accessible to the execution service ES, as we have previously described.

A conditional software code module CCM associates at least one action, such as for example a command to perform or sending a notification to the fulfillment of a condition on one or more state variable(s). The programming of the conditions and the associated actions for the generic models allows performing this programming in a uniform manner for all installations, regardless of the used local protocol(s) implemented in each installation. Using the state conversion SCR and command CCR rules, it is possible to evaluate a generic conditional expression GCE on one or more generic state variable(s) GS depending on the values RSV of low-level state variable RS.

In a first embodiment, the evaluation of the value of a generic state variable GSV can be obtained by the aggregation of two software code snippets selected in the conversion tables described above:

- the first code snippet, «fetch RawValue», allows determining the value RSV of a RS low-level state variable necessary for the evaluation of the condition;
- and the second code snippet allows the transformation of the low-level variable value RSV into generic state variable value GSV.

Each code snippet is performed by a language interpretable expression comprising at least a state conversion rule SCR. It is then possible to perform the evaluation of the generic conditional expression GCE itself depending on the values GSV of generic state variables GS.

The evaluation of this condition in the common language can be performed on a central control unit U of a home automation installation after downloading on this unit. Indeed, the remote control unit U only sees expressions associated with collection and conversion steps using as input the low-level variable values and do not need elements of the reference model or the implementation of the abstraction layer to operate.

Thus, interpretable conditional code modules CCM can be executed locally on the central control unit U.

The method will be described below and illustrated based on an example.

Initially, the method comprises a reception step ETES1 of a message MG or a generation instruction of a conditional software code module CCM coming from a user Usr or an application A on the management unit Sv or other management unit connected to the command message comprising a generic conditional expression GCE relating to at least a generic state variable GS of at least a home automation device D and defining at least a condition evaluation and/or at least a conditional triggering of at least a generic command GC relating to a least one home automation device D.

An example of generic conditional expression GCE is detailed below.

Example the user defines a generic conditional expression GCE:

$$(V1=='auto' \text{ and } v2>v3)$$

With the following generic state variables GS:

| Variable | GDURL | GSID |
| --- | --- | --- |
| v1 | modbus://XXXX/1234 (Heating System) | RegulationModeState |
| v2 | io://XXXX/101 (Temperature Sensor) | TemperatureState |
| v3 | enocean://XXXX/28 (Temperature Sensor) | TemperatureState |

To interpret this expression and to generate the corresponding conditional software code module CCM, it is appropriate to initially proceed to a determination ETES2 of the at least one generic device GD model instance representing the home automation device D and the at least concerned variable GS.

In the considered example, it appears that three generic device GD model instance GD are concerned by the generic conditional expression GCE, and three generic state variables GS (one per instance).

Once step ETES2 is performed, the method comprises a determination step ETES3 of the at least a low-level device RD model instance corresponding to the at least one generic device GD model instance. The low-level instances device RD model, and the generic device GD model instances are stored in association in the IDB database of instances accessible to the execution service ES.

It is thus possible to use the information contained in the identifier GDURL to find the concerned low-level device model instances. Other mechanisms using the index keys as described above can be used.

A determination step of a conversion ETES4 of the generic variables GS and the possible generic commands GC of the generic conditional expression GCE is then performed. This step is performed in particular by a call to the protocol driver PD which has a database of state conversion rules SCR and command conversion rules CCR depending on the types of generic device GD models and of used low-level device RD models.

We have previously described the way a protocol driver proceeds to the conversion of the generic state variables GS based on the conversion rules SCR as expression or interpretable code snippet.

Thus, the protocol drivers provide code snippets corresponding to state conversion rules SCR for determining the values of the generic state variables GS of a device model generic type GDT from values RS of low-level state variables corresponding to a given identifier RSID:

The protocol driver performs for this purpose a conversion rule selection step in the database RDB of conversion rules in a step ETPD4, then returns the conversion rules SCR to apply of directly an expression.

In particular, each protocol driver can use the table Stbl described above, corresponding to the appropriate protocol. Using this table, it is possible to obtain both the identifier RSID of the low-level state variable RS, or possibly a low-level state variables RS corresponding to each generic state variable GS concerned by the generic conditional expression, but also the corresponding conversion rule SCR, as an interpretable code snippet.

Thus, by querying three drivers IO of protocol homecontrol, MODBUS and EnOcean, the following data are obtained for the three variables of the example:

On this basis, in a fifth step ETES5, a generation step of the conditional software code module is performed based on the information collected in the previous steps.

This fifth step may comprise the four following sub-steps:
a. generating ETES5a code snippets for the collection of the values RSV of low-level state variables RS necessary for the evaluation of the generic conditional expression GCE;
b. generating ETES5b code snippets for the conversion of the valuesRSV of low-level state variables RS necessary for the evaluation of the generic conditional expression GCE into value GSV of generic state variables;
c. defining code snippets ETES5c for the evaluation of the generic conditional expression GCE;
d. optionally generating ETES5d code snippets for the definition of low-level commands RC corresponding to the generic commands GC defined in the generic conditional expression, or for the sending of a notification, or for the return of a result. These sub-steps are described below.

In a first sub-step ETES5a, a generation ETES5a of code snippets to collect values RSV of low-level state variables RS necessary for the evaluation of generic conditional expression GCE is performed. To collect the values RSV corresponding to low-level variables, a function is defined, called in the example «fetchRawValue» which can return the desired value RSV, from call parameter corresponding to the identifier of the low-level variable RSID and to the identifier of the low-level device RD model instance.

In particular, the prototype of this function can be of the type:

RSVfetchRawValue (RDPT, RDID, RSID)

Thus, this function takes as parameters:
The used local protocol type RDPT;
The identifier RDID of a low-level device;
The identifier RSID of a low-level state variable.

This function returns a corresponding low-level variable value.

It should be noted that in the described implementation, the identifier of the electronic control unit UID is not specified in the prototype of the function, since it is about data which can be accessible by a global variable. This data however might also be part of the call parameters.

Thus, in the example shown above, it is possible for the execution service, depending on collecting the values RSV of the low-level state variables RS corresponding to the

| GS | GDT | Protocol | RSID | SCR |
|---|---|---|---|---|
| RegulationModeState | HeatingSystem | MODBUS | 0x0C213 | if (v ==123) then return 'auto' else return 'manual' |
| TemperatureState | TemperatureSensor | IO Homecontrol | 0x14 | return v/51200; |
| TemperatureState | TemperatureSensor | EnOcean | 0x08 | return bit.Ishift(v,2)/0.1; |

Thanks to these elements, it is possible to determine the low-level state variables RS whose values must be known to evaluate the generic conditional expression GCE. It is thus possible to determine the identifier RSD of said variables, but also the conversion rules SCR to be applied to the values RSV of the state variables RS to obtain values GSV of generic variables GS to which applies the generic conditional expression GCE.

three generic state variables GS per three calls to the function «fetchRawValue» corresponding to the first three code snippets CFa:

local rawValue1 fetchRawValue=('modbus' 1234, 0x0C213);

local rawValue2 fetchRawValue=('io',101,0x14);

local rawValue3 fetchRawValue=('enocean' 28,0x08);

The three local variables rawValue1, rawValue2 and rawValue3 thus contain the values of the low-level state variables necessary for the evaluation of the generic conditional expression GCE.

Subsequently, in the second sub-step ETES5b, it is possible to set the conversion values of low-level state variables RSV into values of generic state variables GSV based on the conversion rules SCR previously identified.

Thus, in the shown example, the execution service can aggregate the second code snippets CFb corresponding to the conversion rules to perform the following types of conversion:

local v1=(function(v) if (v==123) then return' auto' else return 'manual' end; end) (rawValue1);
local v2=(function(v) return v/51200; end) (rawValue2);
local v3=(function(v) return bit/shift (v, 2)/0.1; end) (rawValue3);

The three local variables v1, v2 and v3 contain the values GSV of the generic state variables necessary for the evaluation of the generic conditional expression GCE.

In a third substep ETES5c, a third code snippet Cfc can then be added corresponding to the evaluation of the generic conditional expression GCE. It should be noted that this code snippet corresponds to the generic conditional expression GCE itself, which does not require translation because the prior conversion returns values GSV which are values of the generic state variables.

Thus, in the shown example, this third code snippet CFc can take the following simple form:

return (v1=='auto' and v2>v3);

According to one embodiment, the expression can return a Boolean value (true/false).

In the context of simple evaluation of an expression, the interpretable code is then defined.

In a fourth optional sub-step ETES5d, the definition of low-level commands RC corresponding to generic commands GC defined in the generic conditional expression can be performed, or even the sending of a notification, or even the sending a result. Here, the fourth step simply corresponds to return a Boolean value and coincides with the definition of the code snippet of the third step.

The code accordingly generated in the four sub-steps can be grouped in one function, for example called «IsConditionVerified».

Thus, in the shown example, said function is defined as follows function isConditionVerified( )
Step 1: fetch raw state values
local rawValue1 fetchRawValue=('modbus', 1234, 0x0C213);
local rawValue2 fetchRawValue=101,0x14);
local rawValue3 fetchRawValue=('enocean' 28,0x08);
Step 2: convert to high-level value
local v1=(function (v) if (v==123) return the' auto' else return' manual' end; end) (rawValue1);
local v2=(function (v) return v/51200; end) (rawValue2);
local v3=(function (v) return bitdshift (v, 2)/0.1; end) (rawValue3);
Step 3: evaluate condition
return (v1=='auto' and v2>v3);
end According to a variant, it is possible to proceed to a generation of the software code of the function grouping the four sub-steps, always starting from the same code snippets selected in the conversion tables, for example to make the code more readable or to optimize it function convert1 (v) if (v==123) return the' auto' else return 'manual' end; end
function convert2 end (v) return v/51200: end
function convert3(v) return bit/shift (v, 2)/0.1; end
function isConditionVerified( )
Step 1: fetch raw state values
local rawValue1 fetchRawValue=('modbus' 1234, 0x0C213);
local rawValue2 fetchRawValue=('io', 101,0x14);
local rawValue3=fetchRawValue=('enocean' 28,0x08);
Step 2: convert to high-level value
local v1=convert1 (rawValue1);
Local v2=convert2 (rawValue2);
local v3=convert3 (rawValue3);
Step 3: evaluate condition
return (v1=='auto' and v2>v3); end The functions «isConditionVerified» respectively «fetchRawValue» have the same prototype either executed by the server or by the central control unit U. The code generation method is then the same in both cases, which leads to generate a interpretable code snippet corresponding to one or more call(s) of the «fetchRawvalue», by passing thereto effective parameters deduced from the generic state variables GS and the generic model instance GD concerned by the generic conditional expression GCE.

Two examples are described below in which an effect is defined as the execution of a command during the fourth step.

In a first example, a statically defined command can be performed. This generic command setClosure( ) allows defining the closure of a shutter. Thus, it is possible to expect to command the full closure of a shutter «setclosure(100)» for a shutter communicating in IO identified by the RDD 31 in connection with the central control unit defined by the UID 1234-5678-0000.

According to a second possibility, a dynamically defined command is performed, for example as a part of a regulation, the command then dependent on a state variable value identified for example by the value v4, for example by applying a calculation rule corresponding to a closure percentage corresponding to (v4−20)*20 for a shutter communicating in IO identified by the RDD 32 in connection with the central control unit defined by the UID 1234-5678-0000.

In both cases, instead of returning a value true/false as in isConditionVerified( ) a sending of low-level command is generated.

During the fourth generation sub-step ETES5d, it is possible from the command conversion rules CCR, to determine that the generic command setClosure(p) is translated into return createActivateFunc (p*51200).

Thus, the following code can be generated:
According to the first example:
return createRawCommand ("io", "31" (function (p1) return createActivateFunc(p1*51200) end) (100));
According to the second example: return createRawCommand ("io", "32" (function(p1) return createActivateFunc(p1*51200) end) ((v2−20)*20));

The content of createRawCommand (protocol, address, raw parameters) is specific in terms of home automation protocol.

The code returns a low-level command RC to execute.

Once the generation step ETES5 is performed, two steps can be performed selectively, depending on whether the execution should be performed on the server Sv or on a central control unit U of a home automation installation. It should be noted that in the different cases, the function or conditional software code module CCM is generated by the server Sv.

In the first case, a step of recording ETES61 of the conditional software code module CCM on the management unit Sv for its execution on said management unit Sv is performed.

In the second case, a step ETES62 of sending the conditional software code module CCM is then performed to the central control unit U with a home automation installation 17 which receives it in a step ETU62 to execute it on said central control unit U Alternatively, it is also possible that only one part of the conditional software code module CCM is interpreted on the central control unit which returns a value to the server Sv, the server Sv interpreting, via the execution service or another process, another part of the conditional software code module Carl.

This can be in particular the case when the generic conditional expression GCE and the conditional software code module CCM define a call to commands.

Figure 8:
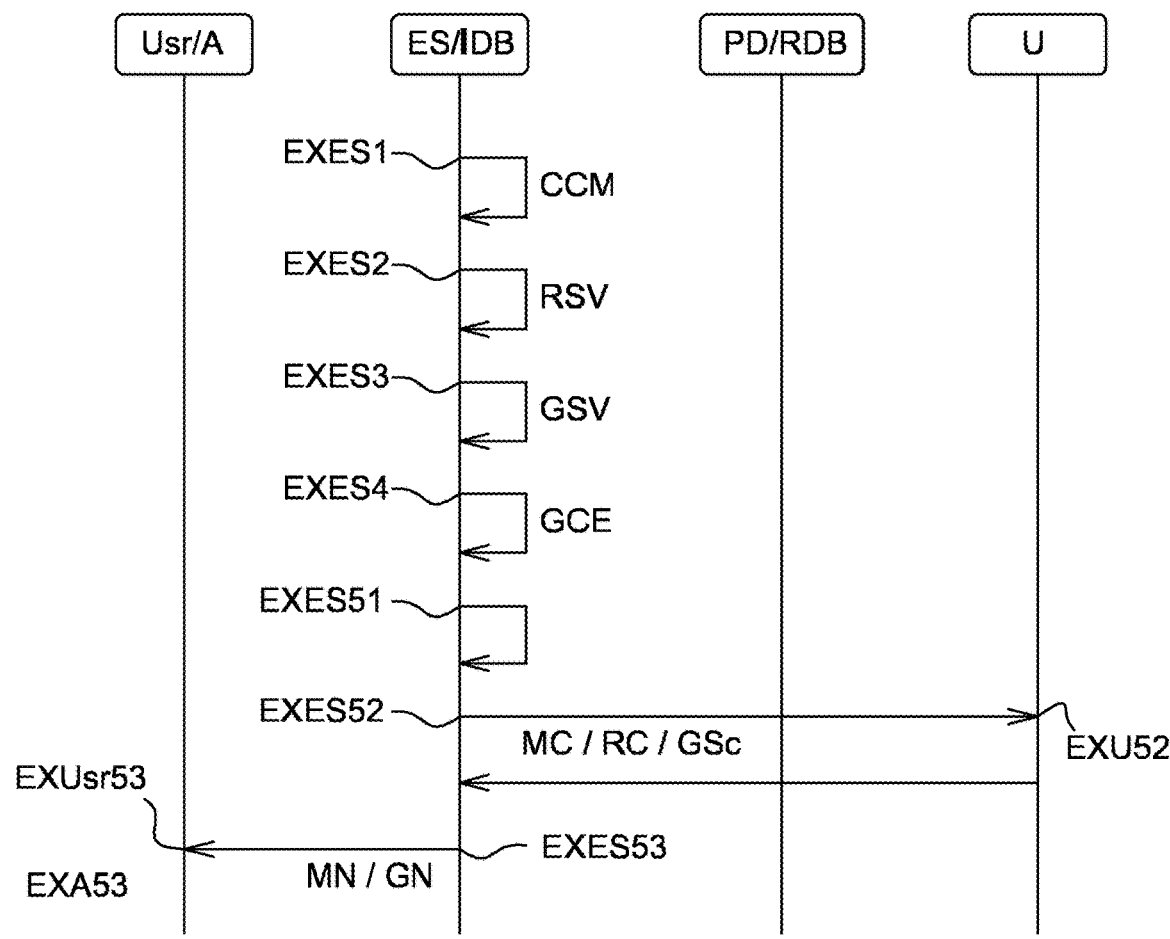
FIG. 8 is a diagram illustrating a mode of implementation of a method for monitoring a home automation installation according to the invention, executed on a management unit connected to a central control unit of a home automation installation.

A monitoring method based on a conditional software code module CCM generated in the generation method described above will now be described with reference to FIG. 8, in a first case where the execution is performed on the server Sv.

In a preliminary step not shown in the figure, a loading of the conditional software code module CCM is performed in a virtual machine, if the conditional software code CMM is expressed as precompiled code snippet, or a triggering of the execution of the interpreter software module IM is performed, if the conditional software code CMM is expressed as a code snippet in interpretable programming language, this conditional software code module CCM corresponding to a generic conditional expression GCE.

In a first step EXES1, a triggering of the execution of the method is performed either periodically upon the expiry of a computer meter, or upon the detection of an event of the value change type of a low-level variable RS.

In a second step EXES2, the low-level variable values in the identified conditional software code module CCM are collected. In the case of an execution on the Server Sv, the implementation of the collection function of the values, namely in the implementation previously presented the function «fetchRawValue», uses the database IDB of instances to obtain the desired values RSV of low-level state variables RS. We will describe the update mechanism of this database later on.

As previously indicated, the values RSV can be stored in the database IDB. The function «fetchRawValue» presents in its parameters identification elements, namely in particular the identifier RSID, the used protocol type RDPT, these identification elements can be completed by the indication of the identifier of the electronic control unit UID which can be defined as local or global variable.

It is thus possible to determine a value of the low-level index key RDK to find the desired low-level device model instance and the value RSV of low-level state variable RS using the identifier of low-level state variable RSID.

In a third step EXES3, a conversion of the values RSV of the low-level state variables RS into values GSV of generic state variables GS is performed based on state conversion rules SCR relating to low-level state variables, these rules are integrated into the conditional software code module CCM as code snippet, as described above;

In a fourth step EXES4, an evaluation of the generic conditional expression GCE is performed;

Following the evaluation of the generic conditional expression GCE, the interpretation conditional software code module CCM can lead to the following steps:

Evaluating EXES51 a result which corresponds to the result of the generic conditional expression GCE and deciding on whether to execute the action, and then, whether the defined condition is met:

Sending EXES52 a command message MC to the central control unit U which receives it in a step EXU52 corresponding to at least a low-level command RC corresponding to at least a generic command GC defined in the generic conditional expression RTP based on at least a command conversion rule OCR; or even sending a trigger message of a generic script GSc or group of commands possibly translated beforehand into low-level commands RC and communicated to the central control unit U, and identified by an identifier of group of commands or script and/or Sending EXES53 at least a notification GN as a notification message MN to a user Usr who receives this message in a step EXUsr53 or an application that he receives in a step EXA53.

According to a variant of the method described above, in the case of sending a low-level command RC corresponding to a high-level command, it is possible that the generic command conversion GC is not performed during the generation method. In this case, a control method taking into account this conversion may be used, which will be detailed later on.

It should be noted that in the case of an execution on the server Sv for the monitoring method described above, it is appropriate that the database IDB is updated with the effective values of the low-level state variables RS.

Figure 9:
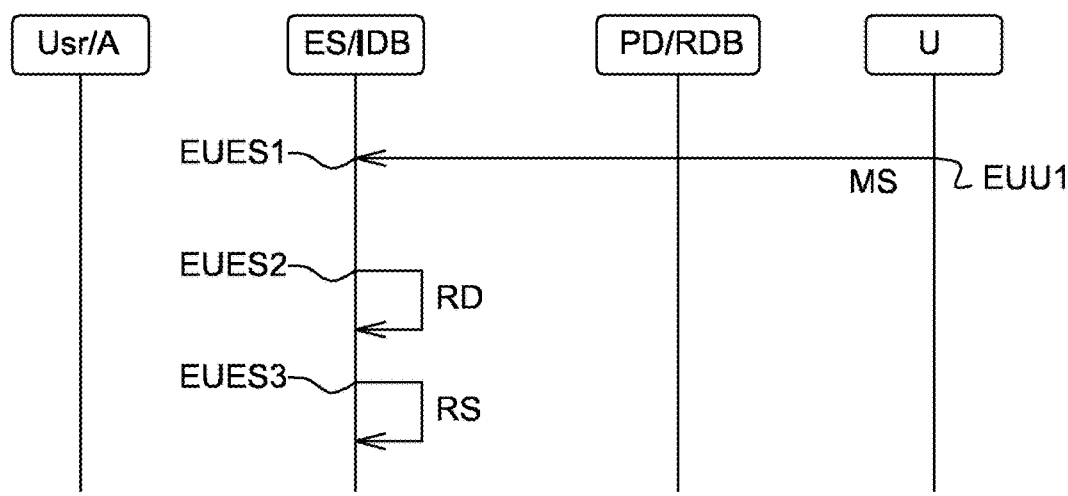
FIG. 9 is a diagram illustrating a mode of implementation of an update method of an instance database according to the invention.

An example of update method of this database is detailed below with reference to FIG. 9. As before, we assume that the update method is performed subsequently to the configuration method described above. Thus, the low-level device RD model instances, and the generic device GD model instance are stored in a database IDB of instances accessible to the execution service ES, as we have previously described.

Initially, the method comprises a step EUES1 of receiving a state notification message MS issued in a step EUU1 by a central control unit U with a home automation installation 17. The state notification message MS contains an indication concerning a low-level state variable RS of a home automation device D. The message MS may contain a protocol identifier RDPT, an address of the device in the protocol RDID, an identifier of the concerned state variable RSID and the new value RSV of the state variable RS.

The method then comprises a determination step EUES2 of the at least a low-level device RD model instance representing the home automation device D. This determination can be in particular performed by using the content of the state notification message MS and/or by identifying the sender of this message, in this example the central control unit U.

In particular, it is appropriate either to use an index key RDK already present in the message, or, if this key is not present, to identify the identification elements allowing determining this key RDK which will be then used to select the low-level model device RD instance in the database IDB, for example in the table RDTbl described above.

The identification elements are explicitly contained in the notification message MS coming from the central control unit U, if this message includes fields dedicated to the identification of source and destination entities of the message; let be deduced upon receipt of the notification message MS. As example, a central control unit can be identified by its IP address, by the TOP port or the combination of these two elements (IP address, TOP port, that is to say the identifier of a socket for an Internet connection); or even by the logic identifier of a communication channel established between the central control unit U and the Server Sv. Once the low-level device RD model instance is identified, an update step EUES3 of the low-level state variable RS in the database IDB is performed.

As we mentioned above, in particular in the case where the interpretation and the execution of the conditional software code module CCM returns a result without triggering a command, it is possible to initiate subsequently a control method which performs the conversion of at least a generic command GC into at least a low-level command RC. Such a control method of at least a home automation installation 17 of a building 1 executed by a server Sv connected to the at least one home automation installation 17 will be now described with reference to FIG. 10. This method may be executed for example by a process or execution service ES using the functions of one or more execution driver(s) PD as described above.

This method comprises an initial step corresponding to the reception ECES1 of the result of the evaluation of a generic conditional expression comprising a generic command GC to execute relating to a home automation device D.

A determination step ECES2 of the at least a generic device GD model instance representing the home automation device D is then performed, in particular by using the unique identifier GDURL of the generic device GD which assumes the role of index key and which groups the necessary identification elements corresponding to a unique generic device GD model instance. This identifier can be included in the command message MC. Once step ECES2 is performed, the method comprises a determination step ECES3 of the at least one low-level device RD mod& instance corresponding to the at least one generic model instance GD determined in the previous step. The low-level device RD model instances, and the generic device GD model instance GD are stored in a database IDB of instances accessible to the execution service ES. Thus, steps ECES2 and ECES3 can be performed by consulting said IDB.

Figure 10:
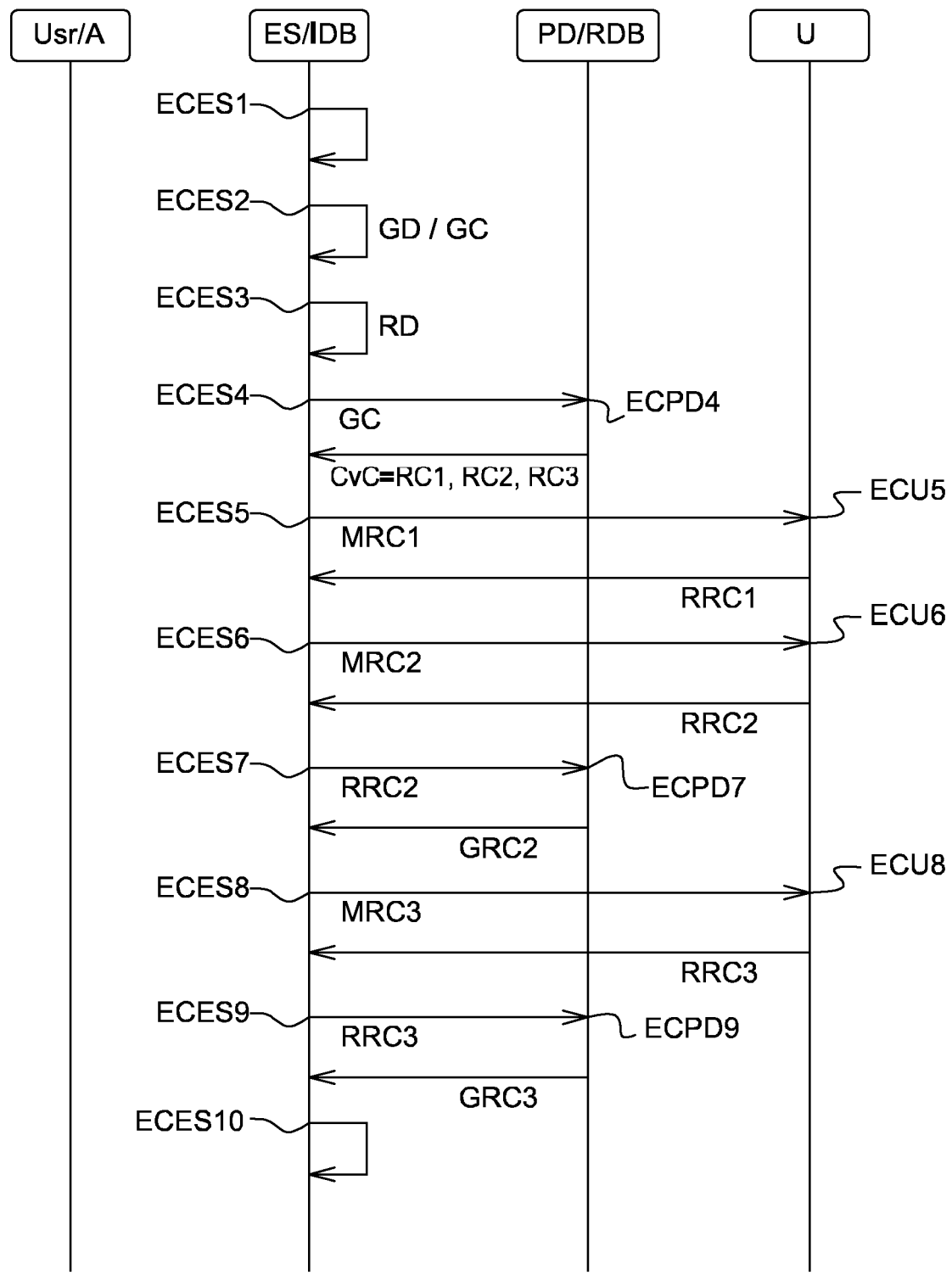
FIG. 10 is a diagram illustrating a mode of implementation of a command method according to the invention.
Figure 11:
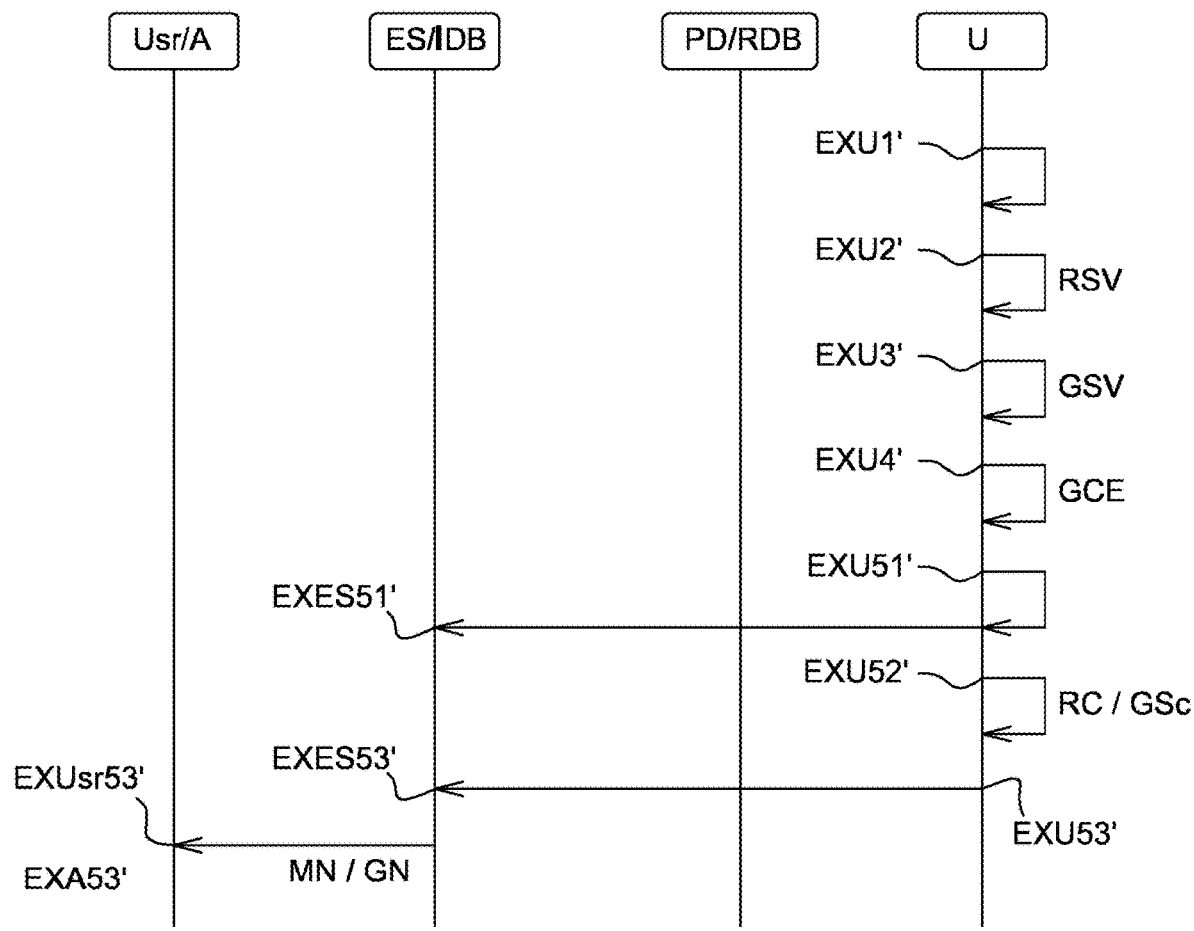
FIG. 11 is a diagram illustrating a mode of implementation of a method for monitoring a home automation installation according to the invention, executed on a central control unit of a home automation installation.

A conversion step ECES4 of one or more generic command(s) GC of the at least one generic device GD model instance determined in step ECES2 into at least a low-level command RC of the low-level device RD mod& instance determined in step ECES3 is then performed. This step is performed in particular by a call to the protocol driver PD which has a database of command conversion rules depending on the types of used generic device GD models and low-level device RD models. The protocol driver performs for this purpose a conversion rule selection step in the conversion rule database RDB in a step ECPD4, then returns a command conversion CvC corresponding to a low-level command RC to execute, or a plurality of low-level commands RC1, RC2, RC3 to execute. Thereafter, the execution of the command can be performed. FIG. 10 corresponds to a case where the conversion of at least a generic command GC applicable to at least an instance of the generic device GD model corresponds to a plurality of low-level command RC1, RC2, RC3. corresponding to the execution of a combination of a plurality of actual commands C on the home automation device D. In this case, the correspondence between the high-level commands GC and associated the low-level commands RC are saved in memory for an appropriate error management. In particular, the execution service ES can implement a finite-state machine for this purpose.

Thus, in a step ECES5, a first command RC1 is sent to the central unit U of the home automation installation 17 for the execution of the command by the device D, in a first low-level command message MRC1. In the shown example, we assume that the return of this initial command represents a success of the command with a return code RRC1, sent by the central control unit U in a step ECUS. The execution service can store a generic return code CRM1 corresponding to this value of success OK for the first command RC1.

In a step ECES6, a second command RC2 is sent to the central unit U of the home automation installation 17 for the execution of the command by the device D, in a second low-level command message MRC2. In the shown example, we assume that the second command return corresponds to a failure of the command, with a return of a return code RRC2 having for example a numerical value −2 corresponding to an error, sent by the central control unit U in a step ECU6.

Thereafter, the execution service requests, in a step ECES7, a conversion of the return code RRC2 into a generic return code GRC2 within the protocol driver PD which performs this conversion in a step ECPD7. As example, the numerical error code −2 can be translated into a generic return code GRC2 corresponding to an error type «unauthorized command». The code GRC2 is stored by the execution service ES.

In a step ECES8, a third command RC3 is sent to the central unit U of the home automation installation 17 for the execution of the command by the home automation device D, in a third low-level control message MRCS. In the shown example, we assume that the third command return corresponds to a failure of the command, with a return of a code RRC3 with for example a numerical value −7, sent by the central control unit U in a step ECU8.

Afterwards, the execution service requests, in a step ECES9, a conversion of the return code RRC3 into a generic return code GRC3 within the protocol driver PD which performs this conversion in a step ECPD9. As example, the numerical error code −2 can be translated into a generic error code GRC3 «no radio response». The code GRC3 is stored by the execution service ES.

In a last step ECES10, the execution service defines a response to return.

Since a result of command or return code CRM1, GRC2, GRC3 has been received for each executed low-level command RC1, RC2, RC3, the results must be aggregated to simulate a global command result over the original generic command. In particular, the generic command is considered as done if all the low-level commands were performed successfully, and not performed if one or more low-level command(s) have faded.

In the case shown in FIG. 10, it is possible to consider that the command GC has failed, and the return code given to the customer should be: «unauthorized command» and «no radio response».

It should be noted that the control method may allow piloting in parallel several products using the same protocol or different local communication protocols.

In particular, it is possible in this case to apply the following steps:
  the low-level commands RC applicable to a home automation device D having no functional subsets are executed sequentially as described above, that is to say that a new command is sent only after receiving the return code corresponding to the execution of the previous command commands related to home automation devices D comprising functional subsets or to a group of automation devices can be performed in parallel, that is to say that the different commands are sent one after the other, but without waiting the reception of the return code corresponding to the execution of commands previously sent, provided that these commands do not concern the same functional subset or even device as part of a group, which amounts to an operation corresponding to command queues per device or per functional subset of the home automation device D.

Such arrangements allow parallelizing the processing of commands on distinct devices or functional subsets of the same home automation device, so as to reduce the processing time of generic commands intended for several distinct home automation devices or for functional subsets of the same home automation device.

These arrangements are particularly adapted for the long command tracking. For example, considering a set of home automation devices formed by a set of 10 roller shutters communicating according to a bidirectional protocol, for example of the homecontrol IO type communicating an information of reaching the desired return position, each shutter can travel the desired stroke in 30 seconds. A sequential processing will cause a realization of the command in 5 minutes, while a parallel processing will allow a realization of the command and a return in 30 seconds.

We have described above a monitoring method on the server Sv, as well as an update method and a control method also executed in the server Sv.

In the examples described above, the operations of determining the instances of devices and state variables, as well as the operations of selecting the conversion rules are performed by the protocol drivers PD which use each conversion tables specific to a determined local communication protocol. In accordance with other embodiments, the conversion tables can contain data concerning several low-level protocols and a single entity can perform said operations, either as a single protocol driver, or as an execution service which centralizes the processings. In this case, the identifier of the low-level protocol RDPT is used as an additional selection element in these data structures.

We will now describe a monitoring method which is executed on a central monitoring unit of a home automation installation.

Such a monitoring method based on a conditional software code module CCM generated in the generation method described above will now be described with reference to FIG. 1 in a second case where the execution is performed on a central control unit U. It is appropriate in this case that a complementary software module, said interpreter module IM, is present on the central control unit U, to allow the execution of the conditional software code module CCM. It is preferable that the same interpretable language is implemented for the generation by the server Sv and for the execution of the code module on the central control unit U or on the server Sv.

In a non-shown preliminary step, the triggering of the execution of the interpreter software module is performed to interpret the conditional software code CCM.

Alternatively, in the case of a conditional software code module CCM expressed as precompiled code for a virtual machine VM, it is appropriate that such a virtual machine is present on the central control unit U. In a non-shown preliminary step, a loading of the conditional software code module CCM in the virtual machine is performed, this conditional software code module CCM corresponding to a generic conditional expression GCE.

In a first step EXU1', a triggering of the execution of the method is performed either periodically upon the expiry of a computer meter, or even upon the detection of an event of the change of value type of one of the low-level variables RS.

In a second step EXU2', the values of the low-level variables in the identified conditional software code module CCM are collected. To this end, the central control unit must implement a local function fetchRawValue (protocol, deviceAddress, rawStateID) to return the values RSV of lower-level state variables RS, which are usually stored in the memory of the central control unit U.

In a third step EXU3', a conversion of values RSV of the low-level state variables RS into values GSV of generic state variables GS is performed based on the state conversion rules SCR relating to low-level state variables, these rules are integrated into the conditional software code module CCM as code snippet, as described above;

In a fourth step EXU4', an evaluation of the generic conditional expression GCE is performed;

Following the evaluation of the generic conditional expression GCE, the execution of the conditional software code module CCM can perform the following steps:

Sending EXU51' a result which corresponds to the result of the generic conditional expression, locally to the Server Sv which can receive this result in a step EXES51'; and/or Triggering EXU52' at least a low-level command RC corresponding to at least a generic command GC optionally defined in the generic conditional expression GCE based on at least a command conversion rule OCR; or even triggering a generic script GSc or a group of commands possibly translated beforehand into low-level commands RC and communicated to the central control unit U, and identified by a identifier of command group or script; and or Sending EXU53' at least a notification GN, in particular via the server Sv in a step EXES53', as a notification message MN to a user Usr who receives this message in a step EXUsr53' or of an application that he receives in a step EXA53'.

Performing these steps depends on the definition of the generic conditional expression GCE.

In the case of step EXU5', in which the central control unit sends the result of the execution of the generic conditional expression to the server Sv, the server Sv may then decide to proceed to the commands as described in the control method described above in the case where this command is not directly integrated into the interpretable code of the conditional software code module CCM.

In the case of step EXU52', the central control unit U interprets the result and triggers the execution of the one or more actual command(s), by sending to the concerned home automation devices low-level command RC messages in accordance with the local protocol. In this case, it is possible to perform the overall execution following the evaluation of the generic conditional expression even if the connection to the server Sv is interrupted.

The invention claimed is:

1. A generation method of a conditional software code module for the monitoring of at least one home automation installation of a building, the at least one home automation installation comprising a plurality of home automation devices, each home automation device of the plurality of home automation devices being represented by at least one generic device model instance and at least one low-level device model instance; the method being performed by a management unit connected to the at least one home automation installation and comprising the following steps of:
  i. receiving a generation message or a generation instruction of a conditional software code module from a user or an application executed on the management unit or on another connected management unit, the generation message containing a generic conditional expression defining at least one evaluation of a condition relating to at least one generic state variable of at least one home automation device of the plurality of home automation devices;
  ii. determining the at least one generic device model instance representing the at least one home automation device of the plurality of home automation devices;
  iii. determining the at least one low-level device model instance corresponding to the at least one generic device model instance determined in step ii;
  iv. determining at least one low-level state variable or at least one type of low-level state variable corresponding to the at least one generic state variable and to the low-level device model instance determined in step iii or to a type of low-level device,
  v. selecting a state conversion rule arranged to convert a value of the at least one low-level state variable into at least one value of the at least one generic state variable as a function of the at least one low-level state variable or of the at least one type of low-level state variable, the state conversion rule being expressed in the form of software code snippet;
  vi. generating a conditional software code module comprising the following sub-steps:
    a. generating at least one first software code snippet for the collection of a value of the at least one type of low-level state variables necessary for the evaluation of the generic conditional expression based on the at least one type of low-level state variable determined in step iv for the at least one low-level device model instance determined in step iii;
    b. generating at least one second software code snippet for the conversion of the value of the at least one low-level state variable necessary for the evaluation of the generic conditional expression into at least one value of generic state variable based on the at least one state conversion rule selected in step v;
    c. defining at least one third software code snippet for the evaluation of the generic conditional expression as a function of the at least one value of the at least one generic state variable determined in step v;
  vii. a step of sending the conditional software code module comprising the at least one first software code snippet, the at least one second software code snippet and the at least one third software code snippets to the central control unit of a home automation installation for execution on the central control unit, or
  a recording step of the conditional software code module comprising the at least one first software code snippet, the at least one second software code snippet and the at least one third software code snippets on the management unit for execution on the management unit.

2. The generation method according to claim 1, wherein:
step i further comprises at least one conditional triggering of at least one action, the at least one action comprising at least one generic command relating to a least one home automation device of the plurality of home automation devices, and
the method further comprising the following step:
vbis selecting a command conversion rule converting the at least one generic command into at least one low-level command as a function of the at least one generic command and of the type of low-level device;
and wherein the generation step vi further comprises the following sub-step of:
  d. generating at least one fourth software code snippet for the definition of low-level commands corresponding to generic commands defined in the generic conditional expression based on a command conversion rule selected in the step vbis, the conversion rule is expressed as a code snippet or expression of an interpretable language, or upon sending a notification.

3. A system comprising a management unit arranged to execute a method according to claim 1, by being connected to a central control unit of a home automation system.

4. The generation method according to claim 1, wherein at least one software code snippet among the at least one first software code snippet, the at least one second software code snippet, the at least one third software code snippet is expressed as:
  a source code snippet of compilable programming language; or
  a precompiled code snippet for a virtual machine implemented on the central control unit or the management intended to execute the conditional software code module; or
  a code snippet of programming language interpretable by a complementary software module, the central control unit or the management unit intended to execute the conditional software code module; or
  a binary code snippet, corresponding to a sequence of machine language instructions compiled by the management unit for a target processor, intended to execute the binary code snippet.

5. The generation method according to claim 4, wherein the at least one third software code snippet for the evaluation of the generic conditional expression comprises an at least partial copy of a condition comprised in the generic conditional expression.

6. The generation method according to claim 2, wherein the at least one third software code snippet for the evaluation of the generic conditional expression comprises an at least partial copy of a condition comprised in the generic conditional expression.

7. The generation method according to claim 2, wherein at least one software code snippet among the at least one first software code snippet, the at least one second software code snippet, the at least one third software code snippet and the at least one fourth software code snippet is expressed as:
  a source code snippet of compilable programming language; or
  a precompiled code snippet for a virtual machine implemented on the central control unit or the management unit intended to execute the conditional software code module; or
  a code snippet of programming language interpretable by a complementary software module, the central control unit or the management unit intended to execute the conditional software code module; or
  a binary code snippet, corresponding to a sequence of machine language instructions compiled by the management unit for a target processor, intended to execute said the binary code snippet.

8. The generation method according to claim 7, wherein the at least one third software code snippet for the evaluation of the generic conditional expression comprises an at least partial copy of a condition comprised in the generic conditional expression.

9. The generation method according to claim 1, wherein the at least one third software code snippet for the evaluation of the generic conditional expression comprises an at least partial copy of a condition comprised in the generic conditional expression.

10. A monitoring method of at least one home automation installation of a building, the at least one home automation installation comprising a plurality of home automation devices, each home automation device of the plurality of home automation devices being represented by at least one generic device model instance and at least one low-level device model instance; the method being executed by a management unit connected to the at least one home automation installation or by a central control unit of the at least one home automation installation and comprising the following steps:
  i. triggering the execution of a conditional software code module arranged to evaluate a generic conditional expression;
  ii. collecting at least one value of low-level state variable identified in the conditional software code module;
  iii. converting the at least one value of low-level state variable into at least one value of generic state variable based on at least one state conversion rule integrated in the conditional software code module as a code snippet; and
  iv. evaluating the generic conditional expression based on at least one value of the at least one generic state variable obtained in step iii.

11. The monitoring method according to claim 10, wherein the conditional software code module comprises
  a. at least one first software code snippet for the collection of at least one value of low-level state variable;
  b. at least one second software code snippet for the conversion of at least one value of the at least one low-level state variable necessary for the evaluation of the generic conditional expression into at least one value of generic state variable based on at least one state conversion rule;
  c. at least one third software code snippet for the evaluation of the generic conditional expression based on the at least one value of the at least one generic state variable;
  d. and at least a fourth software code snippet for the definition of low-level commands corresponding to generic commands defined in the generic conditional expression based on a command conversion rule;
  at least one software code snippet of the at least one first software code snippet, the at least one second software code snippet, the at least one third software code snippet and the at least one fourth software code snippet is expressed in the form of interpretable programming language and in which the management unit connected to the at least one home automation installation or the central control unit of the at least one home automation installation executing the method is also arranged to execute an interpreter software module.

12. The monitoring method according to claim 11, the method being performed by the management unit connected to the at least one home automation installation, the method further comprising the following steps:
  v. evaluating a result of the generic conditional expression and deciding whether to execute an action; then, if a defined condition is met: sending of a command message to the central control unit corresponding to at least one low-level command corresponding to at least one generic command defined in the generic conditional expression based on at least a command conversion rule; and
  vi. sending at least one notification in the form of a notification message to a user or an application.

13. The monitoring method according to claim 12, wherein the method is executed on the management unit connected to the at least one home automation installation, and wherein the collection step ii of at least one value of low-level state variable is performed using a repository or instance database accessible to the management unit.

14. The monitoring method according to claim 11, executed by the central control unit, and further comprising a step of sending to the management unit a message comprising a result of the evaluation step iv of the generic conditional expression based on the at least one value of the at least one generic state variable.

15. The monitoring method according to claim 11, wherein at least the steps i to iv of the method are executed on the central control unit of the at least one home automation installation, and wherein the step ii of collecting at least one value of low-level state variable is performed using values stored in memory of the central control unit.

16. The monitoring method according to claim 10, wherein at least one software code snippet is expressed as a precompiled code for a virtual machine, and in which, in a preliminary step, a loading of the conditional software code module is performed in a virtual machine executed on the management unit connected to the at least one home automation installation or on the central control unit of the at least one home automation installation executing the method, the conditional software code module corresponding to a generic conditional expression.

17. The monitoring method according to claim 10, the method being performed by the management unit connected to the at least one home automation installation, the method further comprising the following steps:
  v. evaluating a result of the generic conditional expression and deciding whether to execute an action; then, if a defined condition is met:
  vi. sending of a command message to the central control unit corresponding to at least one low-level command corresponding to at least one generic command defined in the generic conditional expression based on at least a command conversion rule; and
  vii. sending at least one notification in the form of a notification message to a user or an application.

18. The monitoring method according to claim 10, executed by the central control unit, and further comprising a step of sending to the management unit a message comprising a result of the evaluation step iv of the generic conditional expression based on the at least one value of the at least one generic state variable.

19. The monitoring method according to claim 10, wherein the method is executed on the management unit connected to the at least one home state automation installation, and wherein the collection step ii of at least one value of low-level state variable is performed using a repository or instance database accessible to the management unit.

20. The monitoring method according to claim 10, wherein at least the steps i to iv of the method are executed on the central control unit of the at least one home automation installation, and wherein the step ii of collecting at least one value of low-level state variable is performed using values stored in memory of the central control unit.

\* \* \* \* \*